United States Patent [19]
Okumura et al.

[11] Patent Number: 6,121,182
[45] Date of Patent: Sep. 19, 2000

[54] POLYOLEFIN PRODUCTION CATALYST AND METHOD OF PREPARING POLYOLEFINS

[75] Inventors: Yoshikuni Okumura; Tsutomu Sakuragi; Michio Ono; Shintaro Inazawa, all of Oita, Japan

[73] Assignee: Japan Polyolafins Co., Ltd., Tokyo, Japan

[21] Appl. No.: 08/981,545

[22] PCT Filed: Apr. 22, 1997

[86] PCT No.: PCT/JP97/01387

§ 371 Date: Dec. 11, 1997

§ 102(e) Date: Dec. 11, 1997

[87] PCT Pub. No.: WO97/40075

PCT Pub. Date: Oct. 30, 1997

[30] Foreign Application Priority Data

| Apr. 22, 1996 | [JP] | Japan | ................................. | 8-099696 |
| Feb. 18, 1997 | [JP] | Japan | ................................. | 9-033430 |

[51] Int. Cl.$^7$ .................................................. B01J 31/16
[52] U.S. Cl. .......................... 502/152; 502/155; 526/129; 526/156; 526/158; 526/160; 526/943
[58] Field of Search .................................... 526/160, 943, 526/158, 156, 129, 16 D; 502/152, 155

[56] References Cited

U.S. PATENT DOCUMENTS

| 4,769,510 | 9/1988  | Kaminsky et al. . |         |
| 5,017,714 | 5/1991  | Welborn, Jr. .    |         |
| 5,145,819 | 9/1992  | Winter et al. .   |         |
| 5,239,022 | 8/1993  | Winter et al. .   |         |
| 5,243,001 | 9/1993  | Winter et al. .   |         |
| 5,278,264 | 1/1994  | Spaleck et al.    | 526/160 |
| 5,296,434 | 3/1994  | Karl et al. .     |         |
| 5,304,614 | 4/1994  | Winter et al. .   |         |
| 5,455,366 | 10/1995 | Rohrmann et al. . |         |
| 5,532,396 | 7/1996  | Winter et al. .   |         |
| 5,610,254 | 3/1997  | Sagane et al.     | 526/160 |
| 5,723,640 | 3/1998  | Fukuoka et al.    | 526/160 |
| 5,767,033 | 6/1998  | Imuta et al.      | 526/160 |

FOREIGN PATENT DOCUMENTS

| 0284708 | 10/1988 | European Pat. Off. . |
| 0576970 | 1/1994  | European Pat. Off. . |
| 0615981 | 9/1994  | European Pat. Off. . |
| 0629632 | 12/1994 | European Pat. Off. . |
| 0646604 | 4/1995  | European Pat. Off. . |

OTHER PUBLICATIONS

Macromolecules, 1988, 21, pp. 617 to 622.
Polymer, 1992, 33, pp. 254 to 258.
Journal of Molecular Catalysis, 56 (1989), pp. 237 to 247.
Organometallics, 1994, 13, pp. 964 to 970.
Angew. Chem. Int. Ed. Engl., 1995, 34, pp. 1143 to 1170.
Organometallics, 1989, 8, pp. 1121 to 1122.
J. Am. Chem. Soc., 1988, 110, pp. 976 to 978.
J. Am. Chem. Soc., 1985, 107, pp. 8103 to 8110.
Organometallics, 1995, 14, pp. 5 to 7.
J. Organomet. Chem., 369(1989), pp. 359 to 370.
Macromolecules, 1973, 6, pp. 925 to 926.
Macromolecules, 1975, 8, pp. 687 to 689.
Macromolecules, 1992, 25, pp. 4876 to 4881.
Organometallics, 1994, 13, pp. 954 to 963.
Angew. Chem. Int. Ed. Engl., 1992, 31, pp. 1347 to 1350.

*Primary Examiner*—David W. Wu
*Assistant Examiner*—Ling-Siu Choi
*Attorney, Agent, or Firm*—Sughrue, Mion, Zinn, Macpeak & Seas, PLLC

[57] ABSTRACT

A catalyst component for polyolefin production catalysts comprising a metallocene compound represented by general formula (1) (symbols have the meanings as described in the specification), polyolefin production catalyst containing the component, and method for producing polyolefin with the catalyst are provided. Use of a catalyst containing the novel metallocene compound as a catalyst component of the invention in polymerization of $\alpha$-olefin, particularly propylene, enables one to prepare high rigid, high melting point isotactic polypropylene useful as an industrial material for automobiles and the like, more specifically isotactic polypropylene having highly controlled stereoregulartity and regioregularity, particularly the one having a high regio-regularity that has been difficult to achieve with conventional metallocene catalysts.

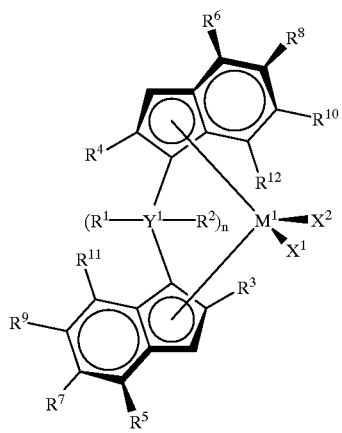

(1)

11 Claims, No Drawings

POLYOLEFIN PRODUCTION CATALYST AND METHOD OF PREPARING POLYOLEFINS

TECHNICAL FIELD

The present invention relates to a polyolefin production catalyst for preparing polyolefins and to a method of preparing polyolefins. More particularly, the present invention relates to novel catalyst components for preparing high rigid, high melting point polyolefins, in particular isotactic poly α-olefins, which are used as industrial material for use in automobiles and the like and which have been difficult to produce with conventional metallocene catalysts; to catalysts for preparing polyolefins with such catalyst components; and to method of preparing polyolefins by using such catalysts.

BACKGROUND ART

Poly(α-olefin)s are known to be those polymers having thermal resistance, rigidity and other properties that are largely influenced by their stereoregularity and regioregularity. Therefore, the performance of poly(α-olefin)s depends largely on the stereoselectivity and regioselectivity of the catalyst used for α-olefin polymerization.

Here, the regioselectivity in isotactic polymerization of propylene is evaluated as a proportion of 1,2-inserted monomers (1,2-insertion, primary insertion) to all the propylene monomers inserted. Besides 1,2-insertion, there are 2,1-insertion or secondary insertion and 1,3-insertion (*Macromolecules*, 1988, 21, 617)(hereafter, the disturbance in regioregularity is referred to as regiodefect).

By the term "2,1-insertion" is meant a linkage containing a 1,2-insertion which includes inserted therein a propylene monomer whose methyne group is bonded to the metal group of a catalyst to form a series of methyne groups bonded together.

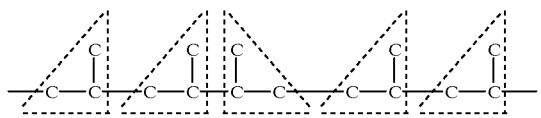

The 2,1-insertion includes two types of configurations, i.e., racemic type and meso type in accordance with the difference in enantioface where the 1,2-inserted monomers after the 2,1-insertion coordinate (*Polymer*, 1992, 33, 254).

By the term "1,3-insertion" is meant that a propylene unit, which is constituted by 3 consecutive methylene units, is inserted in the chain of 1,2-insertions.

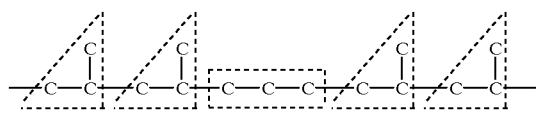

In the isotactic polymerization of propylene with a metallocene catalyst (a catalyst comprised of a metallocene compound and a Lewis acid compound such as methylaluminoxane), the resulting polymer have low melting point compared with the isotactic polypropylene obtained with Ziegler-Natta catalyst, due to existence of regiodefect defects although both the polymers have the same stereoregularity (*J. Mol. Cat.* 56 (1989) 237).

Therefore, in the isotactic polymerization of propylene with a metallocene catalyst, catalyst systems are desired which exhibit increased regioselectivity as well as stereoselectivity.

On the other hand, in the polymerization of α-olefin with a metallocene catalyst, it is known that the stereoregularity and regioregularity of polymers vary considerably depending on the structure of the ligands to the metallocene compound (*Macromolecules*, 1988, 21, 617; *Organometallics*, 1994, 13, 964; *Angew Chem. Int. Ed. Engl.*, 1995, 34, 1143).

Japanese Patent Application (Kokai) No. 61-130314 (U.S. Pat. No. 4,769,510) and Japanese Patent Application (Kokai) No. 63-295607 (European Patent No. 284,708) disclose rac-ethylidenebis(1-indenyl)zirconium dichloride, rac-ethylidenebis(4,5,6,7-tetrahydro-1-indenyl)zirconium dichloride, rac-dimethylsilylenebis(1-indenyl)zirconium dichloride and other $C_2$ symmetrical type metallocene compounds represented by the following general formula (5)

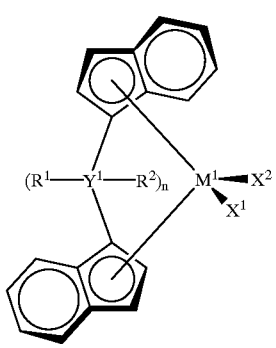

(5)

The metallocene compounds give rise to isotactic polypropylene in the presence of methylaluminoxane or other Lewis acid promoter. However, isotactic polypropylene polymers obtained using the metallocene compound under the conditions above 25° C. that are useful industrially have low molecular weight and insufficient stereoregularity and regioregularity so that the polymer has low melting point. Therefore, the product is unsuitable for high rigid, high melting point isotactic polypropylene useful as an industrial material.

Thereafter, with view to improving the stereoregularity, molecular weight and the like of polymer, various $C_2$ symmetrical metallocene compounds having introduced therein one or more substituent groups in its indene ring, represented by the following general formula (6) have been proposed (Japanese Patent Application (Kokai) No. 4-268307 (U.S. Pat. No. 5,243,001), Japanese Patent Application (Kokai) No. 4-268308 (U.S. Pat. No. 5,239,022), Japanese Patent Application (Kokai) No. 4-300887 (U.S. Pat. No. 5,145,819), Japanese Patent Application (Kokai) No. 5-306304 (U.S. Pat. No. 5,304,614), Japanese Patent Application (Kokai) No. 6-184179 (U.S. Pat. No. 5,455,366), Japanese Patent Application (Kokai) No. 7-2920 (European Patent No. 615,981), Japanese Patent Application (Kokai) No. 7-149815 (European Patent No. 646,604), and Japanese Patent Application (Kokai) No. 5-209014 (U.S. Pat. No. 5,296,434).

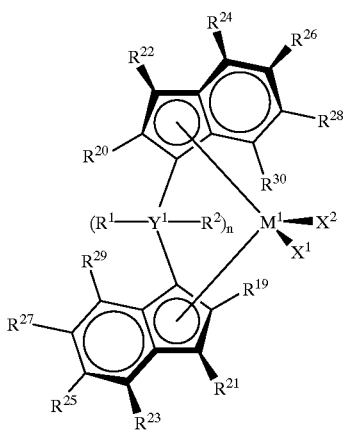

(6)

Specifically disclosed are those $C_2$ symmetrical type metallocene compounds represented by the general formula (6) in which $R^{19}=R^{20}$, $R^{21}=R^{22}$, $R^{23}=R^{24}$, $R^{25}=R^{26}$, $R^{27}=R^{28}$, and $R^{29}=R^{30}$ and $R^{19}$ and $R^{20}$ are both a methyl group or an ethyl group.

In particular, Japanese Patent Application (Kokai) No. 6-100579 (European Patent No. 576,970) discloses those $C_2$ symmetrical type metallocene compounds in which $R^{23}$ and $R^{24}$ are both an aryl group. The isotactic polypropylene polymerized using the compound as a catalyst component was an isotactic polypropylene having an improved stereoregularity and a relatively high melting point.

However, the product was insufficient to be high rigid, high melting point isotactic polypropylene useful as an industrial material due to the existence of regiodefects in the polymer chain.

Also, Japanese Patent Application (Kokai) No. 7-286005 (European Patent No. 629,632) discloses those $C_2$ symmetrical type metallocene compounds represented by the general formula (6) in which $R^{19}$ and $R^{20}$ are both a primary hydrocarbon group (a hydrocarbon group which is bonded to the indene ring through a carbon atom in $CH_2$ unit (the 1-position atom according to IUPAC rules for the nomenclature of organic compounds) such as an ethyl group, a n-propyl group or an i-butyl group. However, the isotactic polypropylene polymerized using this type of metallocene compound as a catalyst component is also insufficient as high rigid, high melting point isotactic polypropylene useful as an industrial material due to the existence of regiodefects in the polymer chain.

As a metallocene catalyst for isotactic polymerization of α-olefins, there have been known $C_1$ symmetrical type metallocene compounds having no symmetry axis in addition to the above-mentioned $C_2$ symmetrical type metallocene compounds.

Of the $C_1$ symmetrical type metallocene compounds represented by the general formula (6) in which two indenyl groups are different from each other, there have been disclosed those compounds of formula (6) in which $R^{19}$ and $R^{20}$ are combinations of a hydrogen atom, a methyl group and an ethyl group (Japanese Patent Application (Kokai) No. 8-67689 (U.S. Pat. No. 5,532,396)). However, the isotactic polypropylene polymerized using the $C_1$ symmetrical type metallocene compound as a catalyst component had insufficient stereoregularity and regioregularity so as to be useful as a high rigid and high melting point industrial material.

OBJECT OF THE INVENTION

An object of the present invention is to provide a novel metallocene catalyst for preparing polyolefins, particularly isotactic poly(α-olefin)s, and in particular, to provide a metallocene catalyst which can produce high rigid, high melting point isotactic polypropylenes useful as an industrial material for automobiles, and more specifically those isotactic polypropylenes having highly controlled stereoregularity and regioregularity as a result of improvement in regioselectivity that have been difficult to fully control with the conventional metallocene catalyst and suppression of regiodefects.

Another object of the present invention is to provide a method for preparing polypropylenes with the above-mentioned metallocene catalyst, in particular, to provide a method for preparing high rigid, high melting point isotactic polypropylene, more specifically isotactic polypropylene having an improved regioselectivity that has been difficult to control with conventional catalysts and being free of regiodefects.

SUMMARY OF THE INVENTION

As a result of intensive investigation, the present inventors have now found that, among the metallocene compounds composed of two indene rings with different substituents, the metallocene compounds having a special substituent on the indene ring, which is represented by the general formula (1) below can be a catalyst component which is effective for achieving the above-mentioned objects and completed the present invention.

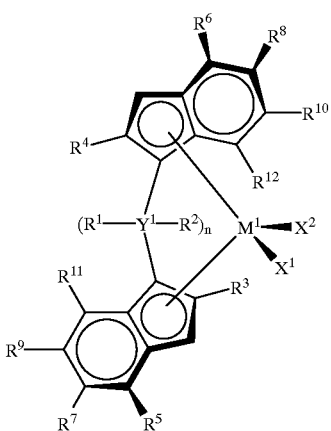

(1)

wherein $M^1$ is a transient metal atom selected from Ti, Zr, and Hf; $X^1$ and $X^2$, which are the same or different, represent each a hydrogen atom, a halogen atom, a hydrocarbon group having 1 to 20 carbon atoms which may contain a halogen atom, an OR group, a SR group, an OCOR group, a $SO_2R$ group, an $OSO_2R$ group or NRR' group (where R and R', which are the same or different, represent each a hydrogen atom or a hydrocarbon group having 1 to 7 carbon atoms which may contain a halogen atom);

$R^1$ and $R^2$, which are the same or different, represent each a hydrogen atom, a hydrocarbon group having 1 to 20 carbon atoms, an OR" group or a SR" group (where R" is a hydrogen atom or a hydrocarbon group having 1 to 7 carbon atoms) or combine to form a ring;

$R^3$ is a hydrogen atom or a group represented by the general formula (2)

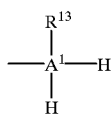

(2)

wherein $A^1$ is a carbon atom, a silicon atom, a germanium atom or a tin atom; $R^{13}$ is a hydrogen atom, a halogen atom, or a hydrocarbon group having 1 to 7 carbon atoms which may contain a silicon atom and/or a halogen atom;

$R^4$ is a group represented by the general formula (3)

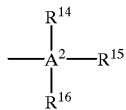

(3)

wherein $A^2$ is a carbon atom, a silicon atom, a germanium atom or a tin atom; $R^{14}$ to $R^{16}$, which are the same or different, represent each a hydrogen atom, a halogen atom, or a hydrocarbon group having 1 to 7 carbon atoms which may contain a silicon atom or a halogen atom, provided that two or more of $R^{14}$ to $R^{16}$ are not a hydrogen atom simultaneously; or $R^{14}$ to $R^{16}$ may together with $A^2$ combine to form a ring;

$R^5$ to $R^{12}$, which are the same or different, represent each a hydrogen atom or a hydrocarbon group having 1 to 20 carbon atoms which may contain a silicon atom or combine to form a ring together with the carbon atoms to which they are attached;

$Y^1$ is a carbon atom, a silicon atom or a germanium atom; and n is an integer of from 1 to 3.

Therefore, the present invention provides the following catalyst component for preparing polyolefins, catalyst for preparing polyolefins, and a method for preparing polyolefins.

1) A catalyst component for polyolefin production catalysts, comprising the metallocene compound represented by the general formula (1) above.

2) The catalyst component for polyolefin production catalysts according to 1) above, comprising the metallocene compound represented by the general formula (1) in which $R^4$ is an i-propyl group, a 1-methylpropyl group, a 1-ethylpropyl group, a 1-methylbutyl group, a 1-ethylbutyl group, a 1-propylbutyl group, a cyclopentyl group, a cyclohexyl group or a phenyl group.

3) The catalyst component for polyolefin production catalysts according to 1) above, comprising the metallocene compound represented by the general formula (1) in which $R^5$ is a hydrocarbon group having 1 to 20 carbon atoms which may contain a silicon atom.

4) The catalyst component for polyolefin production catalysts according to 1) above, comprising the metallocene compound represented by the general formula (1) in which $R^4$ is an i-propyl group, a 1-methylpropyl group, a 1-ethylpropyl group, a 1-methylbutyl group, a 1-ethylbutyl group, a 1-propylbutyl group, a cyclopentyl group, a cyclohexyl group or a phenyl group; and $R^5$ is a hydrocarbon group having 1 to 20 carbon atoms which may contain a silicon atom.

5) The catalyst component for polyolefin production catalysts according to 4) above, comprising the metallocene compound represented by the general formula (1) in which $R^4$ is an i-propyl group; and $R^5$ is a hydrocarbon group having 1 to 20 carbon atoms which may contain a silicon atom.

6) A polyolefin production catalyst for preparing polyolefins, comprising (A) a catalyst component as described in any one of 1) to 5) above; (B) a Lewis acid compound; and (C) an organic aluminum compound.

7) A polyolefin production catalyst for preparing polyolefins, comprising (A) a catalyst component as described in any one of 1) to 5) above; (B) a Lewis acid compound; (C) an organic aluminum compound; and (D) a fine particle carrier.

8) A method for preparing polyolefins, comprising polymerizing olefins with a catalyst as described in 6) or 7) above.

9) A method for preparing isotactic poly(α-olefin)s, comprising polymerizing α-olefins represented by the general formula (4)

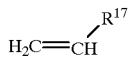

(4)

wherein $R^{17}$ is a hydrocarbon group having 1 to 6 carbon atoms, with a catalyst as described in 6) or 7) above.

DETAILED DESCRIPTION OF THE INVENTION

Hereafter, the catalyst for polymerizing olefins and the method for preparing polyolefins according to the present invention will be described concretely.

Formula (7) below indicates the position number of substituents on the indenyl ring of the metallocene compound, which is a catalyst component according to the present invention, represented by the general formula (1). For example, the substituent $R^3$ is at the 2'-position and the substituent $R^4$ is at the 2-position.

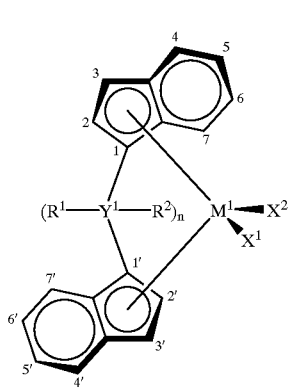

(7)

Further, the metallocene compounds of the present invention represented by the general formula (1) are $C_1$ symmetrical type metallocene compounds having no symmetry axis. They have structural isomers due to the difference in coordinate bonds similarly to the $C_2$ symmetrical type metallocene compounds.

Hereafter, in the present invention, when the skeleton of the indene ring of the metallocene compound is viewed, those compounds having a stereoscopic structure corresponding to a $C_2$ symmetrical racemic form are called racemic (rac) form and those compounds having a stereoscopic structure corresponding to a $C_2$ symmetrical meso form are called pseudo-racemic (p-rac) form (Japanese Patent Application (Kokai) No. 8-67689 (U.S. Pat. No. 5,532,396)). The metallocene compounds of the present invention represented by the general formula (1) are of racemic form.

(A) Metallocene compound

Novel metallocene compounds, which are the catalyst component of the present invention (A) and a first component constituting the catalyst for preparing polyolefins according to the present invention, are represented by the general formula (1) above.

One of advantageous features in structure of the metallocene compounds represented by the general formula (1) is that the substituent at the 2'-position of the indene ring (i.e., the substituent $R^3$) is the substituent represented by the general formula (2) and the substituent at the 2-position (i.e., the substituent $R^4$) has the substituent represented by the general formula (3).

If the both of the substituents at the 2- and 2'-positions are the substituents represented by the general formula (2) or the ones represented by the general formula (3), there can be prepared no isotactic polypropylene that has controlled stereoregularity and regioregularity simultaneously.

Hereafter, the compounds represented by the general formula (1) are described concretely.

$R^1$ and $R^2$, which may be the same or different, represent each a hydrogen atom, a hydrocarbon group having 1 to 20 carbon atoms, an OR group or a SR group (where R is a hydrogen atom, or a hydrocarbon group having 1 to 7 carbon atoms, which may contain a halogen atom) or combine to form a ring.

Specifically, the hydrocarbon group having 1 to 7 carbon atoms includes alkyl groups such as a methyl group, an ethyl group, a n-propyl group, an i-propyl group, a n-butyl group, an i-butyl group, a t-butyl group, and a n-pentyl group; cycloalkyl groups such as a cyclopentyl group and a cyclohexyl group; alkenyl groups such as a vinyl group and a propenyl group; aryl groups such as a phenyl group, a tolyl group, a 2,6-dimethylphenyl group, and a 2,4,6-trimethylphenyl group; and arylalkyl groups such as a phenylmethyl group, a diphenylmethyl group, a triphenylmethyl group and a phenylethyl group.

The OR group includes a hydroxyl group, alkoxy groups such as a methoxy group, an ethoxy group, a propoxy group, and a butoxy group; and aryloxy groups such as a phenoxy group. The SR group includes alkylthio groups such as a mercapto group and a methylthio group; and arylthio groups such as a phenylthio group. Preferably, R is selected from a methyl group, an ethyl group, and a phenyl group.

$R^3$ is a hydrogen atom or a group represented by the general formula (2)

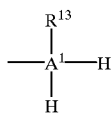

(2)

wherein $A^1$ is a carbon atom, a silicon atom, a germanium atom or a tin atom;

$R^{13}$ is a hydrogen atom, a halogen atom, or a hydrocarbon group having 1 to 7 carbon atoms which may contain a silicon atom and/or a halogen atom. Specifically, $R^{13}$ includes a hydrogen atom; alkyl groups such as a methyl group, an ethyl group, a n-propyl group, a n-butyl group, an i-butyl group, and a n-pentyl group; arylalkyl groups such as a phenylmethyl group and a phenylethyl group; and the like.

$R^4$ is a group represented by the general formula (3)

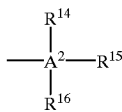

(3)

wherein $A^2$ is a carbon atom, a silicon atom, a germanium atom or a tin atom;

$R^{14}$ to $R^{16}$, which are the same or different, represent each a hydrogen atom, a halogen atom, or a hydrocarbon group having 1 to 7 carbon atoms which may contain a silicon atom or a halogen atom, provided that two or more of $R^{14}$ to $R^{16}$ are not a hydrogen atom simultaneously; or $R^{14}$ to $R^{16}$ may together with $A^2$ combine to form a ring;

Specific examples thereof include alkyl groups such as an i-propyl group, a 1-methylpropyl group, a 1-ethylpropyl group, a 1-methylbutyl group, a 1-ethylbutyl group, a 1-propylbutyl group, and a t-butyl group; cycloalkyl groups such as a cyclopentyl group, a cyclohexyl group, and an adamantyl group; alkenyl groups such as a 1-methylethenyl group and a 1-methyl-1-propenyl group; arylalkyl groups such as a diphenylmethyl group and a triphenylmethyl group; aryl groups such as a phenyl group, a tolyl group, a 2,6-dimethylphenyl group, a 2,4,6-trimethylphenyl group, a 2,3,4,5,6-pentafluorophenyl group, a 1-naphthyl group, a 2-naphthyl group, and anthracenyl group; halogenated alkyl groups such as a trifluoromethyl group; alkylsilyl groups such as a trimethylsilyl group; and silylalkyl groups such as a tris(trimethylsilyl)methyl group; and the like.

$R^5$ is a hydrogen atom or a hydrocarbon group having 1 to 20 carbon atoms which may contain a silicon atom.

Specific examples thereof include a hydrogen atom; alkyl groups such as a methyl group, an ethyl group, a n-propyl group, an i-propyl group, a n-butyl group, an i-butyl group, a t-butyl group, and a n-pentyl group; cycloalkyl groups such as a cyclopentyl group, a cyclohexyl group, and an adamantyl group; alkenyl groups such as a vinyl group and a propenyl group; aryl groups such as a phenyl group, a tolyl group, a 2,6-dimethylphenyl group, a 2,4,6-trimethylphenyl group, a 1-naphthyl group, a 2-naphthyl group, and an anthracenyl group; arylalkyl groups such as a benzyl group, a diphenylmethyl group, a triphenylmethyl group, and a phenylethyl group; alkylsilyl groups such as a methylsilyl group, a dimethylsilyl group, and a trimethylsilyl group; a silylalkyl groups such as a tris(trimethylsilyl)methyl group; and the like.

$R^5$ exhibits excellent effects when it is a substituent other than hydrogen atom. For example, alkyl groups such as a methyl group, an ethyl group, an i-propyl group, a n-butyl group, an i-butyl group, a t-butyl group, and a n-pentyl group and aryl groups such as a phenyl group, a tolyl group, a 1-naphthyl group, and an anthracenyl group are particularly preferred.

$R^6$ to $R^{12}$, which are the same or different, represent each a hydrogen atom or a hydrocarbon group having 1 to 20 carbon atoms which may contain a silicon atom. Specific examples thereof include a hydrogen atom; alkyl groups such as a methyl group, an ethyl group, a n-propyl group, an i-propyl group, a n-butyl group, an i-butyl group, a t-butyl group, and a n-pentyl group; cycloalkyl groups such as a cyclopentyl group, a cyclohexyl group, and an adamantyl group; alkenyl groups such as a vinyl group and a propenyl group; aryl groups such as a phenyl group, a tolyl group, a 2,6-dimethylphenyl group, a 2,4,6-trimethylphenyl group, a 1-naphthyl group, a 2-naphthyl group, and an anthracenyl group; arylalkyl groups such as a benzyl group, a diphenylmethyl group, a triphenylmethyl group, and a phenylethyl group; alkylsilyl groups such as a methylsilyl group, a dimethylsilyl group, and a trimethylsilyl group; a silylalkyl groups such as tris(trimethylsilyl)methyl group; and the like. In particular, a hydrogen atom, alkyl groups such as a methyl group, an ethyl group, a n-propyl group, an i-propyl group, a n-butyl group, an i-butyl group, a t-butyl group, and a n-pentyl group and aryl groups such as a phenyl group, a tolyl group, a 1-naphthyl group, and an anthracenyl group and the like are preferred.

Alternatively, $R^5$ to $R^{12}$ may combine to form a ring together with the carbon atoms to which they are attached. In this case, it is particularly preferred that adjacent groups combine together to form a 6-membered aromatic ring. Specific examples thereof include 4,5-benzo-indene (benzo[e]indene), 5,6-benzo-indene (benzo[f]indene) and the like. Particularly preferred is 4,5-benzo-indene (benzo[e]indene).

$X^1$ and $X^2$, which are the same or different, represent each a hydrogen atom, a halogen atom, a hydrocarbon group having 1 to 20 carbon atoms which may contain a halogen atom, an OR group, a SR group, an OCOR group, a $SO_2R$ group, an $OSO_2R$ group or a NRR' group (where R and R', which are the same or different, represent each a hydrogen atom or a hydrocarbon group having 1 to 7 carbon atoms which may contain a halogen atom or R and R' may combine together with the nitrogen atom to which they are attached to form a ring).

Specific examples of the halogen atom include fluorine, chlorine, bromine, and iodine.

Examples of the hydrocarbon group having 1 to 20 carbon atoms which may contain a halogen atom include alkyl groups such as a methyl group, an ethyl group, a n-propyl group, an i-propyl group, a n-butyl group, an i-butyl group, a t-butyl group, and a n-pentyl group; cycloalkyl groups such as a cyclopentyl group, a cyclohexyl group, and an adamantyl group; alkenyl groups such as a vinyl group and a propenyl group; aryl groups such as a phenyl group, a tolyl group, a 2,6-dimethylphenyl group, and a 2,4,6-trimethylphenyl group; arylalkyl groups such as a benzyl group, phenylmethyl group, a triphenylmethyl group, and a phenylethyl group; halogenated alkyl groups such as a trifluoromethyl group; halogenated aryl groups such as a pentafluorophenyl group; and the like.

The OR group includes a hydroxyl group, alkoxy groups such as a methoxy group, an ethoxy group, a propoxy group, and a butoxy group; aryloxy groups such as a phenoxy group. The SR group includes a mercapto group, alkylthio groups such as a methylthio group or arylthio groups such as a phenylthio group. The OCOR group includes a carboxyl group or alkoxycarbonyl groups such as a methoxycarbonyl group. The $SO_2R$ group includes a sulfino group, alkylsulfino groups such as a methylsulfino group, or arylsulfino groups such as a phenylsulfino group. The $OSO_2R$ group includes a sulfo group, alkylsulfo groups such as a methylsulfo group, arylsulfo groups such as a phenylsulfo group, a p-toluenesulfo group. The NRR' group includes an amino group, alkylamino groups such as a methylamino group, a dimethylamino group, a diethylamino group, and a dibutylamino group; and arylamino groups such as a phenylamino group.

Of these, $X^1$ and $X^2$ are selected, preferably, from a halogen atom and alkyl groups such as a methyl group.

$Y^1$ is a carbon atom, a silicon atom or a germanium atom.

Particularly preferred for the moiety represented by $(R^1-Y^1-R^2)_n$ is the one in which n=1 or 2.

Also, $R^1$ and $R^2$ may combine together with $Y^1$ to form a ring. In this case, for example, 1,1-cyclohexylidene, 1,1-biphenyl and the like are preferred.

Specific examples of the metallocene compounds of the present invention as described above include the following compounds. Here, the terms used in the following specific examples have the following meanings. Me=a methyl group, Et=an ethyl group, i-Pr=an i-propyl group, t-Bu=a t-butyl group, 1-MePr=a 1-methylpropyl group, 1-EtPr=a 1-ethylpropyl group, 1-PrBu=a 1-propylbutyl group, Ph=a phenyl group, 4-MePh=a 4-methylphenyl group, Naph=a naphthyl group, Ind=an inden-1-yl group, Benzind=a benzoinden-1-yl group, Cyclopentyl=a cyclopentyl group, Si[]=a silylene group, Et[]=an ethylidene group.

rac-Me$_2$Si[(2-i-PrInd)(Ind)]ZrCl$_2$,
rac-Me$_2$Si[(2-i-Pr-4-PhInd)(Ind)]ZrCl$_2$,
rac-Me$_2$Si[(2-i-Pr-4-(1-Naph)Ind)(Ind)]ZrCl$_2$,
rac-Me$_2$Si[(2-(1-MePr)Ind)(Ind)]ZrCl$_2$,
rac-Me$_2$Si[(2-(1-EtPr)Ind)(Ind)]ZrCl$_2$,
rac-Me$_2$Si[(2-(1-PrBu)Ind)(Ind)]ZrCl$_2$,
rac-Me$_2$Si[(2-(2-Cyclopentyl)Ind)(Ind)]ZrCl$_2$,
rac-Me$_2$Si[(2-t-BuInd)(Ind)]ZrCl$_2$,
rac-Me$_2$Si[(2-PhInd)(Ind)]ZrCl$_2$,
rac-Me$_2$Si[(2-(4-MePh)Ind)(Ind)]ZrCl$_2$,
rac-Me$_2$Si[(2-i-PrInd)(2'-MeInd)]ZrCl$_2$,
rac-Me$_2$Si[(2-i-Pr-4-PhInd)(2'-MeInd)]ZrCl$_2$,
rac-Me$_2$Si[(2-i-Pr-4-(1-Naph)Ind)(2'-MeInd)]ZrCl$_2$,
rac-Me$_2$Si[(2-(1-MePr)Ind)(2'-MeInd)]ZrCl$_2$,
rac-Me$_2$Si[(2-(1-EtPr)Ind)(2'-MeInd)]ZrCl$_2$,
rac-Me$_2$Si[(2-(1-PrBu)Ind)(2'-MeInd)]ZrCl$_2$,
rac-Me$_2$Si[(2-(2-Cyclopentyl)Ind)(2'-MeInd)]ZrCl$_2$,
rac-Me$_2$Si[(2-t-BuInd)(2'-MeInd)]ZrCl$_2$,
rac-Me$_2$Si[(2-PhInd)(2'-MeInd)]ZrCl$_2$,
rac-Me$_2$Si[(2-(4-MePh)Ind)(2'-MeInd)]ZrCl$_2$,
rac-Me$_2$Si[(2-i-PrInd)(2'-EtInd)]ZrCl$_2$,
rac-Me$_2$Si[(2-i-Pr-4-PhInd)(2'-EtInd)]ZrCl$_2$,
rac-Me$_2$Si[(2-i-Pr-4-(1-Naph)Ind)(2'-EtInd)]ZrCl$_2$,
rac-Me$_2$Si[(2-(1-MePr)Ind)(2'-EtInd)]ZrCl$_2$,
rac-Me$_2$Si[(2-(1-EtPr)Ind)(2'-EtInd)]ZrCl$_2$,
rac-Me$_2$Si[(2-(1-PrBu)Ind)(2'-EtInd)]ZrCl$_2$,
rac-Me$_2$Si[(2-(2-Cyclopentyl)Ind)(2'-EtInd)]ZrCl$_2$,
rac-Me$_2$Si[(2-t-BuInd)(2'-EtInd)]ZrCl$_2$,
rac-Me$_2$Si[(2-PhInd)(2'-EtInd)]ZrCl$_2$,
rac-Me$_2$Si[(2-(4-MePh)Ind)(2'-EtInd)]ZrCl$_2$,
rac-Et[(2-i-PrInd)(Ind)]ZrCl$_2$,
rac-Et[(2-i-Pr-4-PhInd)(Ind)]ZrCl$_2$,
rac-Et[(2-i-Pr-4-(1-Naph)Ind)(Ind)]ZrCl$_2$,
rac-Et[(2-(1-MePr)Ind)(Ind)]ZrCl$_2$,
rac-Et[(2-(1-EtPr)Ind)(Ind)]ZrCl$_2$,
rac-Et[(2-(1-PrBu)Ind)(Ind)]ZrCl$_2$,
rac-Et[(2-(2-Cyclopentyl)Ind)(Ind)]ZrCl$_2$,
rac-Et[(2-t-BuInd)(Ind)]ZrCl$_2$,
rac-Et[(2-PhInd)(Ind)]ZrCl$_2$,
rac-Et[(2-(4-MePh)Ind)(Ind)]ZrCl$_2$,
rac-Et[(2-i-PrInd)(2'-MeInd)]ZrCl$_2$,
rac-Et[(2-i-Pr-4-PhInd)(2'-MeInd)]ZrCl$_2$,
rac-Et[(2-i-Pr-4-(1-Naph)Ind)(2'-MeInd)]ZrCl$_2$,
rac-Et[(2-(1-MePr)Ind)(2'-MeInd)]ZrCl$_2$,
rac-Et[(2-(1-EtPr)Ind)(2'-MeInd)]ZrCl$_2$,
rac-Et[(2-(1-PrBu)Ind)(2'-MeInd)]ZrCl$_2$,
rac-Et[(2-(2-Cyclopentyl)Ind)(2'-MeInd)]ZrCl$_2$,
rac-Et[(2-t-BuInd)(2'-MeInd)]ZrCl$_2$,
rac-Et[(2-PhInd)(2'-MeInd)]ZrCl$_2$,
rac-Et[(2-(4-MePh)Ind)(2'-MeInd)]ZrCl$_2$,
rac-Me$_2$Si[(2-i-PrInd)(4'-MeInd)]ZrCl$_2$,
rac-Me$_2$Si[(2-i-Pr-4-PhInd)(4'-MeInd)]ZrCl$_2$,
rac-Me$_2$Si[(2-i-Pr-4-(1-Naph)Ind)(4'-MeInd)]ZrCl$_2$,
rac-Me$_2$Si[(2-(1-MePr)Ind)(4'-MeInd)]ZrCl$_2$,
rac-Me$_2$Si[(2-(1-EtPr)Ind)(4'-MeInd)]ZrCl$_2$,
rac-Me$_2$Si[(2-(1-PrBu)Ind)(4'-MeInd)]ZrCl$_2$, rac-Me$_2$Si[(2-(2-Cyclopentyl)Ind)(4'-MeInd)]ZrCl$_2$,
rac-Me$_2$Si[(2-t-BuInd)(4'-MeInd)]ZrCl$_2$,
rac-Me$_2$Si[(2-PhInd)(4'-MeInd)]ZrCl$_2$,
rac-Me$_2$Si[(2-(4-MePh)Ind)(4'-MeInd)]ZrCl$_2$,
rac-Me$_2$Si[(2-i-PrInd)(2',4'-Me$_2$Ind)]ZrCl$_2$,
rac-Me$_2$Si[(2-i-Pr-4-PhInd)(2',4'-Me$_2$Ind)]ZrCl$_2$,
rac-Me$_2$Si[(2-i-Pr-4-(1-Naph)Ind)(2',4'-Me$_2$Ind)]ZrCl$_2$,
rac-Me$_2$Si[(2-i-Pr-4-MeInd)(2',4'-Me$_2$Ind)]ZrCl$_2$,
rac-Me$_2$Si[(2-i-Pr-4,7-Me$_2$Ind)(2',4'-Me$_2$Ind)]ZrCl$_2$,
rac-Me$_2$Si[(2,4-i-Pr$_2$Ind)(2',4'-Me$_2$Ind)]ZrCl$_2$,
rac-Me$_2$Si[(2,4,6-i-Pr$_3$Ind)(2',4'-Me$_2$Ind)]ZrCl$_2$,
rac-Me$_2$Si[(2-(1-MePr)Ind)(2',4'-Me$_2$Ind)]ZrCl$_2$,
rac-Me$_2$Si[(2-(1-EtPr)Ind)(2',4'-Me$_2$Ind)]ZrCl$_2$,
rac-Me$_2$Si[(2-(1-PrBu)Ind)(2',4'-Me$_2$Ind)]ZrCl$_2$,
rac-Me$_2$Si[(2-(2-Cyclopentyl)Ind)(2',4'-Me$_2$Ind)]ZrCl$_2$,
rac-Me$_2$Si[(2-t-BuInd)(2',4'-Me$_2$Ind)]ZrCl$_2$,
rac-Me$_2$Si[(2-PhInd)(2',4'-Me$_2$Ind)]ZrCl$_2$,
rac-Me$_2$Si[(2-(4-MePh)Ind)(2',4'-Me$_2$Ind)]ZrCl$_2$,
rac-Me$_2$Si[(2-i-PrInd)(2',4',7'-Me$_3$Ind)]ZrCl$_2$
rac-Me$_2$Si[(2-i-Pr-4-PhInd)(2',4',7'-Me$_3$Ind)]ZrCl$_2$,
rac-Me$_2$Si[(2-i-Pr-4-(1-Naph)Ind)(2',4',7'-Me$_3$Ind)]ZrCl$_2$,
rac-Me$_2$Si[(2-i-Pr-4-MeInd)(2',4',7'-Me$_3$Ind)]ZrCl$_2$
rac-Me$_2$Si[(2-i-Pr-4,7-Me$_2$Ind)(2',4',7'-Me$_3$Ind)]ZrCl$_2$
rac-Me$_2$Si[(2,4-i-Pr$_2$Ind)(2',4',7'-Me$_3$Ind)]ZrCl$_2$
rac-Me$_2$Si[(2,4,6-i-Pr$_3$Ind)(2',4',7'-Me$_3$Ind)]ZrCl$_2$
rac-Me$_2$Si[(2-(1-MePr)Ind)(2',4',7'-Me$_3$Ind)]ZrCl$_2$,
rac-Me$_2$Si[(2-(1-EtPr)Ind)(2',4',7'-Me$_3$Ind)]ZrCl$_2$,
rac-Me$_2$Si[(2-(1-PrBu)Ind)(2',4',7'-Me$_3$Ind)]ZrCl$_2$,
rac-Me$_2$Si[(2-(2-Cyclopentyl)Ind)(2',4',7'-Me$_3$Ind)]ZrCl$_2$,
rac-Me$_2$Si[(2-t-BuInd)(2',4',7'-Me$_3$Ind)]ZrCl$_2$,
rac-Me$_2$Si[(2-PhInd)(2',4',7'-Me$_3$Ind)]ZrCl$_2$,
rac-Me$_2$Si[(2-(4-MePh)Ind)(2',4',7'-Me$_3$Ind)]ZrCl$_2$,
rac-Me$_2$Si[(2-i-PrInd)(2',4',6'-Me$_3$Ind)]ZrCl$_2$,
rac-Me$_2$Si[(2-i-Pr-4-PhInd)(2',4',6'-Me$_3$Ind)]ZrCl$_2$,
rac-Me$_2$Si[(2-i-Pr-4-(1-Naph)Ind)(2',4',6'-Me$_3$Ind)]ZrCl$_2$,
rac-Me$_2$Si[(2-i-Pr-4-MeInd)(2',4',6'-Me$_3$Ind)]ZrCl$_2$,
rac-Me$_2$Si[(2-i-Pr-4,7-Me$_2$Ind)(2',4',6'-Me$_3$Ind)]ZrCl$_2$,
rac-Me$_2$Si[(2,4-i-Pr$_2$Ind)(2',4',6'-Me$_3$Ind)]ZrCl$_2$,
rac-Me$_2$Si[(2,4,6-i-Pr$_3$Ind)(2',4',6'-Me$_3$Ind)]ZrCl$_2$,
rac-Me$_2$Si[(2-(1-MePr)Ind)(2',4',6'-Me$_3$Ind)]ZrCl$_2$,
rac-Me$_2$Si[(2-(1-EtPr)Ind)(2',4',6'-Me$_3$Ind)]ZrCl$_2$,
rac-Me$_2$Si[(2-(1-PrBu)Ind)(2',4',6'-Me$_3$Ind)]ZrCl$_2$,
rac-Me$_2$Si[(2-(2-Cyclopentyl)Ind)(2',4',6'-Me$_3$Ind)]ZrCl$_2$,
rac-Me$_2$Si[(2-t-BuInd)(2',4',6'-Me$_3$Ind)]ZrCl$_2$,
rac-Me$_2$Si[(2-PhInd)(2',4',6'-Me$_3$Ind)]ZrCl$_2$,
rac-Me$_2$Si[(2-(4-MePh)Ind)(2',4',6'-Me$_3$Ind)]ZrCl$_2$,
rac-Me$_2$Si[(2-i-PrInd)(4'-i-PrInd)]ZrCl$_2$,
rac-Me$_2$Si[(2-i-Pr-4-PhInd)(4'-i-PrInd)]ZrCl$_2$,
rac-Me$_2$Si[(2-i-Pr-4-(1-Naph)Ind)(4'-i-PrInd)]ZrCl$_2$,
rac-Me$_2$Si[(2-i-Pr-4-MeInd)(4'-i-PrInd)]ZrCl$_2$,
rac-Me$_2$Si[(2-i-Pr-4,7-Me$_2$Ind)(4'-i-PrInd)]ZrCl$_2$,
rac-Me$_2$Si[(2,4-i-Pr$_2$Ind)(4'-i-PrInd)]ZrCl$_2$,
rac-Me$_2$Si[(2,4,6-i-Pr$_3$Ind)(4'-i-PrInd)]ZrCl$_2$,
rac-Me$_2$Si[(2-(1-MePr)Ind)(4'-i-PrInd)]ZrCl$_2$,
rac-Me$_2$Si[(2-(1-EtPr)Ind)(4'-i-PrInd)]ZrCl$_2$,
rac-Me$_2$Si[(2-(1-PrBu)Ind)(4'-i-PrInd)]ZrCl$_2$,
rac-Me$_2$Si[(2-(2-Cyclopentyl)Ind)(4'-i-PrInd)]ZrCl$_2$,
rac-Me$_2$Si[(2-BuInd)(4'-i-PrInd)]ZrCl$_2$,
rac-Me$_2$Si[(2-PhInd)(4'-i-PrInd)]ZrCl$_2$,
rac-Me$_2$Si[(2-(4-MePh)Ind)(4'-i-PrInd)]ZrCl$_2$,
rac-Me$_2$Si[(2-i-PrInd)(2'-Me-4'-i-PrInd)]ZrCl$_2$,
rac-Me$_2$Si[(2-i-Pr-4-PhInd)(2'-Me-4'-i-PrInd)]ZrCl$_2$,
rac-Me$_2$Si[(2-i-Pr-4-(1-Naph)Ind)(2'-Me-4'-i-PrInd)]ZrCl$_2$,
rac-Me$_2$Si[(2-i-Pr-4-MeInd)(2'-Me-4'-i-PrInd)]ZrCl$_2$,
rac-Me$_2$Si[(2-i-Pr-4,7-Me$_2$Ind)(2'-Me-4'-i-PrInd)]ZrCl$_2$,
rac-Me$_2$Si[(2,4-i-Pr$_2$Ind)(2'-Me-4'-i-PrInd)]ZrCl$_2$,
rac-Me$_2$Si[(2,4,7-i-Pr$_3$Ind)(2'-Me-4'-i-PrInd)]ZrCl$_2$,
rac-Me$_2$Si[(2-(1-MePr)Ind)(2'-Me-4'-i-PrInd)]ZrCl$_2$,
rac-Me$_2$Si[(2-(1-EtPr)Ind)(2'-Me-4'-i-PrInd)]ZrCl$_2$,
rac-Me$_2$Si[(2-(1-PrBu)Ind)(2'-Me-4'-i-PrInd)]ZrCl$_2$,
rac-Me$_2$Si[(2-(2-Cyclopentyl)Ind)(2'-Me-4'-i-PrInd)]ZrCl$_2$,
rac-Me$_2$Si[(2-t-BuInd)(2'-Me-4'-i-PrInd)]ZrCl$_2$,
rac-Me$_2$Si[(2-PhInd)(2'-Me-4'-i-PrInd)]ZrCl$_2$,
rac-Me$_2$Si[(2-(4-MePh)Ind)(2'-Me-4'-i-PrInd)]ZrCl$_2$,
rac-Me$_2$Si[(2-i-PrInd)(2',7'-Me$_2$-4'-i-PrInd)]ZrCl$_2$,
rac-Me$_2$Si[(2-i-Pr-4-PhInd)(2',7'-Me$_2$-4'-i-PrInd)]ZrCl$_2$,
rac-Me$_2$Si[(2-i-Pr-4-(1-Naph)Ind)(2',7'-Me$_2$-4'-i-PrInd)]ZrCl$_2$,
rac-Me$_2$Si[(2-i-Pr-4-MeInd)(2',7'-Me$_2$-4'-i-PrInd)]ZrCl$_2$,
rac-Me$_2$Si[(2-i-Pr-4,7-Me$_2$Ind)(2',7'-Me$_2$-4'-i-PrInd)]ZrCl$_2$,
rac-Me$_2$Si[(2,4-i-Pr$_2$Ind)(2',7'-Me$_2$-4'-i-PrInd)]ZrCl$_2$,
rac-Me$_2$Si[(2,4,7-i-Pr$_3$Ind)(2',7'-Me$_2$-4'-i-PrInd)]ZrCl$_2$,
rac-Me$_2$Si[(2-(1-MePr)Ind)(2',7'-Me$_2$-4'-i-PrInd)]ZrCl$_2$,
rac-Me$_2$Si[(2-(1-EtPr)Ind)(2',7'-Me$_2$-4'-i-PrInd)]ZrCl$_2$,
rac-Me$_2$Si[(2-(1-PrBu)Ind)(2',7'-Me$_2$-4'-i-PrInd)]ZrCl$_2$,
rac-Me$_2$Si[(2-(2-Cyclopentyl)Ind)(2',7'-Me$_2$-4'-i-PrInd)]ZrCl$_2$,
rac-Me$_2$Si[(2-t-BuInd)(2',7'-Me$_2$-4'-i-PrInd)]ZrCl$_2$,
rac-Me$_2$Si[(2-PhInd)(2',7'-Me$_2$-4'-i-PrInd)]ZrCl$_2$,
rac-Me$_2$Si[(2-(4-MePh)Ind)(2',7'-Me$_2$-4'-i-PrInd)]ZrCl$_2$,
rac-Me$_2$Si[(2-i-PrInd)(2'-Me-4'-t-BuInd)]ZrCl$_2$,
rac-Me$_2$Si[(2-i-Pr-4-PhInd)(2'-Me-4'-t-BuInd)]ZrCl$_2$,
rac-Me$_2$Si[(2-i-Pr-4-(1-Naph)Ind)(2'-Me-4'-t-BuInd)]ZrCl$_2$,
rac-Me$_2$Si[(2-i-Pr-4-MeInd)(2'-Me-4'-t-BuInd)]ZrCl$_2$,
rac-Me$_2$Si[(2-i-Pr-4,7-Me$_2$Ind)(2'-Me-4'-t-BuInd)]ZrCl$_2$,
rac-Me$_2$Si[(2,4-i-Pr$_2$Ind)(2'-Me-4'-t-BuInd)]ZrCl$_2$,
rac-Me$_2$Si[(2,4,7-i-Pr$_3$Ind)(2'-Me-4'-t-BuInd)]ZrCl$_2$,
rac-Me$_2$Si[(2-(1-MePr)Ind)(2'-Me-4'-t-BuInd)]ZrCl$_2$,
rac-Me$_2$Si[(2-(1-EtPr)Ind)(2'-Me-4'-t-BuInd)]ZrCl$_2$,
rac-Me$_2$Si[(2-(1-PrBu)Ind)(2'-Me-4'-t-BuInd)]ZrCl$_2$,
rac-Me$_2$Si[(2-(2-Cyclopentyl)Ind)(2'-Me-4'-t-BuInd)]ZrCl$_2$,
rac-Me$_2$Si[(2-4-BuInd)(2'-Me-4'- t-BuInd)]ZrCl$_2$,
rac-Me$_2$Si[(2-PhInd)(2'-Me-4'-t-BuInd)]ZrCl$_2$,
rac-Me$_2$Si[(2-(4-MePh)Ind)(2'-Me-4'-t-BuInd)]ZrCl$_2$,
rac-Me$_2$Si[(2-i-PrInd)(2',7'-Me$_2$-4'-t-BuInd)]ZrCl$_2$,
rac-Me$_2$Si[(2-i-Pr-4-PhInd)(2',7'-Me$_2$-4'-t-BuInd)]ZrCl$_2$,
rac-Me$_2$Si[(2-i-Pr-4-(1-Naph)Ind)(2',7'-Me$_2$-4'-t-BuInd)]ZrCl$_2$,
rac-Me$_2$Si[(2-i-Pr-4-MeInd)(2',7'-Me$_2$-4'-t-BuInd)]ZrCl$_2$,
rac-Me$_2$Si[(2-i-Pr-4,7-Me$_2$Ind)(2',7'-Me$_2$-4'-t-BuInd)]ZrCl$_2$,
rac-Me$_2$Si[(2,4-i-Pr$_2$Ind)(2',7'-Me$_2$-4'-t-BuInd)]ZrCl$_2$,
rac-Me$_2$Si[(2,4,7-i-Pr$_3$Ind)(2',7'-Me$_2$-4'-t-BuInd)]ZrCl$_2$,
rac-Me$_2$Si[(2-(1-MePr)Ind)(2',7'-Me$_2$-4'-t-BuInd)]ZrCl$_2$,
rac-Me$_2$Si[(2-(1-EtPr)Ind)(2',7'-Me$_2$-4'-t-BuInd)]ZrCl$_2$,
rac-Me$_2$Si[(2-(1-PrBu)Ind)(2',7'-Me$_2$-4'-t-BuInd)]ZrCl$_2$,
rac-Me$_2$Si[(2-(2-Cyclopentyl)Ind)(2',7'-Me$_2$-4'-t-BuInd)]ZrCl$_2$,
rac-Me$_2$Si[(2-t-BuInd)(2',7'-Me$_2$-4'-t-BuInd)]ZrCl$_2$,
rac-Me$_2$Si[(2-PhInd)(2',7'-Me$_2$-4'-t-BuInd)]ZrCl$_2$,
rac-Me$_2$Si[(2-(4-MePh)Ind)(2',7'-Me$_2$-4'-t-BuInd)]ZrCl$_2$,
rac-Me$_2$Si[(2-i-PrInd)(2'-Me-4',6'-i-Pr$_2$Ind)]ZrCl$_2$,
rac-Me$_2$Si[(2-i-Pr-4-PhInd)(2'-Me-4',6'-i-Pr$_2$Ind)]ZrCl$_2$,
rac-Me$_2$Si[(2-i-Pr-4-(1-Naph)Ind)(2'-Me-4',6'-i-Pr$_2$Ind)]ZrCl$_2$,
rac-Me$_2$Si[(2-i-Pr-4-MeInd)(2'-Me-4',6'-i-Pr$_2$Ind)]ZrCl$_2$,
rac-Me$_2$Si[(2-i-Pr-4,7-Me$_2$Ind)(2'-Me-4',6'-i-Pr$_2$Ind)]ZrCl$_2$,
rac-Me$_2$Si[(2,4-i-Pr$_2$Ind)(2'-Me-4',6'-i-Pr$_2$Ind)]ZrCl$_2$,
rac-Me$_2$Si[(2,4,6-i-Pr$_3$Ind)(2'-Me-4',6'-i-Pr$_2$Ind)]ZrCl$_2$,
rac-Me$_2$Si[(2-(1-MePr)Ind)(2'-Me-4',6'-i-Pr$_2$Ind)]ZrCl$_2$,
rac-Me$_2$Si[(2-(1-EtPr)Ind)(2'-Me-4',6'-i-Pr$_2$Ind)]ZrCl$_2$,
rac-Me$_2$Si[(2-(1-PrBu)Ind)(2'-Me-4',6'-i-Pr$_2$Ind)]ZrCl$_2$,
rac-Me$_2$Si[(2-(2-Cyclopentyl)Ind)(2'-Me-4',6'-i-Pr$_2$Ind)]ZrCl$_2$, rac-Me₂Si[(2-t-BuInd)(2'-Me-4',6'-i-Pr₂Ind)]ZrCl₂,
rac-Me₂Si[(2-PhInd)(2'-Me-4',6'-i-Pr₂Ind)]ZrCl₂,
rac-Me₂Si[(2-(4-MePh)Ind)(2'-Me-4',6'-i-Pr₂Ind)]ZrCl₂,
rac-Me₂Si[(2-i-PrInd)(2'-Me-4'-PhInd)]ZrCl₂,
rac-Me₂Si[(2-i-Pr-4-PhInd)(2'-Me-4'-PhInd)]ZrCl₂,
rac-Me₂Si[(2-i-Pr-4-(1-Naph)Ind)(2'-Me-4'-PhInd)]ZrCl₂,
rac-Me₂Si[(2-i-Pr-4-MeInd)(2'-Me-4'-PhInd)]ZrCl₂,
rac-Me₂Si[(2-i-Pr-4,7-Me₂Ind)(2'-Me-4'-PhInd)]ZrCl₂,
rac-Me₂Si[(2,4-i-Pr₂Ind)(2'-Me-4'-PhInd)]ZrCl₂,
rac-Me₂Si[(2,4,6-i-Pr₃Ind)(2'-Me-4'-PhInd)]ZrCl₂,
rac-Me₂Si[(2-(1-MePr)Ind)(2'-Me-4'-PhInd)]ZrCl₂,
rac-Me₂Si[(2-(1-EtPr)Ind)(2'-Me-4'-PhInd)]ZrCl₂,
rac-Me₂Si[(2-(1-PrBu)Ind)(2'-Me-4'-PhInd)]ZrCl₂,
rac-Me₂Si[(2-(2-Cyclopentyl)Ind)(2'-Me-4'-PhInd)]ZrCl₂,
rac-Me₂Si[(2-t-BuInd)(2'-Me-4'-PhInd)]ZrCl₂,
rac-Me₂Si[(2-PhInd)(2'-Me-4'-PhInd)]ZrCl₂,
rac-Me₂Si[(2-(4-MePh)Ind)(2'-Me-4'-PhInd)]ZrCl₂,
rac-Me₂Si[(2-i-PrInd)(2'-Me-4'-(1-Naph)Ind)]ZrCl₂,
rac-Me₂Si[(2-i-Pr-4-PhInd)(2'-Me-4'-(1-Naph)Ind)]ZrCl₂,
rac-Me₂Si[(2-i-Pr-4-(1-Naph)Ind)(2'-Me-4'-(1-Naph)Ind)]ZrCl₂,
rac-Me₂Si[(2-i-Pr-4-MeInd)(2'-Me-4'-(1-Naph)Ind)]ZrCl₂
rac-Me₂Si[(2-i-Pr-4,7-Me₂Ind)(2'-Me-4'-(1-Naph)Ind)]ZrCl₂
rac-Me₂Si[(2,4-i-Pr₂Ind)(2'-Me-4'-(1-Naph)Ind)]ZrCl₂
rac-Me₂Si[(2,4,6-i-Pr₃Ind)(2'-Me-4'-(1-Naph)Ind)]ZrCl₂
rac-Me₂Si[(2-(1-MePr)Ind)(2'-Me-4'-(1-Naph)Ind)]ZrCl₂,
rac-Me₂Si[(2-(1-EtPr)Ind)(2'-Me-4'-(1-Naph)Ind)]ZrCl₂,
rac-Me₂Si[(2-(1-PrBu)Ind)(2'-Me-4'-(1-Naph)Ind)]ZrCl₂,
rac-Me₂Si[(2-(2-Cyclopentyl)Ind)(2'-Me-4'-(1-Naph)Ind)]ZrCl₂,
rac-Me₂Si[(2-t-BuInd)(2'-Me-4'-(1-Naph)Ind)]ZrCl₂,
rac-Me₂Si[(2-Ph)Ind)(2'-Me-4'-(1-Naph)Ind)]ZrCl₂,
rac-Me₂Si[(2-(4-MePh)Ind)(2'-Me-4'-(1-Naph)Ind)]ZrCl₂,
rac-Me₂Si[(2-i-PrInd)(2'-Me-4',5'-Benzind)]ZrCl₂,
rac-Me₂Si[(2-i-Pr-4-PhInd)(2'-Me-4',5'-Benzind)]ZrCl₂,
rac-Me₂Si[(2-i-Pr-4-(1-Naph)Ind)(2'-Me-4',5'-Benzind)]ZrCl₂,
rac-Me₂Si[(2-i-Pr-4-MeInd)(2'-Me-4',5'-Benzind)]ZrCl₂,
rac-Me₂Si[(2-i-Pr-4,7-Me₂Ind)(2'-Me-4',5'-Benzind)]ZrCl₂,
rac-Me₂Si[(2,4-i-Pr₂Ind)(2'-Me-4',5'-Benzind)]ZrCl₂,
rac-Me₂Si[(2,4,6-i-Pr₃Ind)(2'-Me-4',5'-Benzind)]ZrCl₂,
rac-Me₂Si[(2-(1-MePr)Ind)(2'-Me-4',5'-Benzind)]ZrCl₂,
rac-Me₂Si[(2-(1-EtPr)Ind)(2'-Me-4',5'-Benzind)]ZrCl₂,
rac-Me₂Si[(2-(1-PrBu)Ind)(2'-Me-4',5'-Benzind)]ZrCl₂,
rac-Me₂Si[(2-(2-Cyclopentyl)Ind)(2'-Me-4',5'-Benzind)]ZrCl₂,
rac-Me₂Si[(2-t-BuInd)(2'-Me-4',5'-Benzind)]ZrCl₂,
rac-Me₂Si[(2-PhInd)(2'-Me-4',5'-Benzind)]ZrCl₂,
rac-Me₂Si[(2-(4-MePh)Ind)(2'-Me-4',5'-Benzind)]ZrCl₂,
rac-Me₂Si[(2-i-PrInd)(2'-Et-4'-PhInd)]ZrCl₂,
rac-Me₂Si[(2-i-Pr-4-PhInd)(2'-Et-4'-PhInd)]ZrCl₂,
rac-Me₂Si[(2-i-Pr-4-(1-Naph)Ind)(2'-Et-4'-PhInd)]ZrCl₂,
rac-Me₂Si[(2-i-Pr-4-MeInd)(2'-Et-4'-PhInd)]ZrCl₂,
rac-Me₂Si[(2-i-Pr-4,7-Me₂Ind)(2'-Et-4-PhInd)]ZrCl₂,
rac-Me₂Si[(2,4-i-Pr₂Ind)(2'-Et-4'-PhInd)]ZrCl₂,
rac-Me₂Si[(2,4,6-i-Pr₃Ind)(2'-Et-4'-PhInd)]ZrCl₂,
rac-Me₂Si[(2-(1-MePr)Ind)(2'-Et-4'-PhInd)]ZrCl₂,
rac-Me₂Si[(2-(1-EtPr)Ind)(2'-Et-4'-PhInd)]ZrCl₂,
rac-Me₂Si[(2-(1-PrBu)Ind)(2'-Et-4'-PhInd)]ZrCl₂,
rac-Me₂Si[(2-(2-Cyclopentyl)Ind)(2'-Et-4'-PhInd)]ZrCl₂,
rac-Me₂Si[(2-t-BuInd)(2'-Et-4'-PhInd)]ZrCl₂,
rac-Me₂Si[(2-PhInd)(2'-Et-4'-PhInd)]ZrCl₂,
rac-Me₂Si[(2-(4-MePhInd)(2'-Et-4'-PhInd)]ZrCl₂,
rac-Me₂Si[(2-i-PrInd)(2'-Et-4'-(1-Naph)Ind)ZrCl₂,
rac-Me₂Si[(2-i-Pr-4-PhInd)(2'-Et-4'-(1-Naph)Ind)]ZrCl₂,
rac-Me₂Si[(2-i-Pr-4-(1-Naph)Ind)(2'-Et-4'-(1-Naph)Ind)]ZrCl₂,
rac-Me₂Si[(2-i-Pr-4-MeInd)(2'-Et-4'-(1-Naph)Ind)]ZrCl₂,
rac-Me₂Si[(2-i-Pr-4,7-Me₂Ind)(2'-Et-4'-(1-Naph)Ind)]ZrCl₂,
rac-Me₂Si[(2,4-i-Pr₂Ind)(2'-Et-4'-(1-Naph)Ind)]ZrCl₂,
rac-Me₂Si[(2,4,7-i-Pr₃Ind)(2'-Et-4'-(1-Naph)Ind)]ZrCl₂,
rac-Me₂Si[(2-(1-MePr)Ind)(2'-Et-4'-(1-Naph)Ind)]ZrCl₂,
rac-Me₂Si[(2-(1-EtPr)Ind)(2'-Et-4'-(1-Naph)Ind)]ZrCl₂,
rac-Me₂Si[(2-(1-PrBu)Ind)(2'-Et-4'-(1-Naph)Ind)]ZrCl₂,
rac-Me₂Si[(2-(2-Cyclopentyl)Ind)(2'-Et-4'-(1-Naph)Ind)]ZrCl₂,
rac-Me₂Si[(2-t-BuInd)(2'-Et-4'-(1-Naph)Ind)]ZrCl₂,
rac-Me₂Si[(2-PhInd)(2'-Et-4'-(1-Naph)Ind)]ZrCl₂,
rac-Me₂Si[(2-(4-MePh)Ind)(2'-Et-4'-(1-Naph)Ind)]ZrCl₂,
rac-Me₂Si[(2-i-PrInd)(2'-Et-4',5'-Benzind)]ZrCl₂,
rac-Me₂Si[(2-i-Pr-4-PhInd)(2'-Et-4',5'-Benzind)]ZrCl₂,
rac-Me₂Si[(2-i-Pr-4-(1-Naph)Ind)(2'-Et-4',5'-Benzind)]ZrCl₂,
rac-Me₂Si[(2-i-Pr-4-MeInd)(2'-Et-4',5'-Benzind)]ZrCl₂,
rac-Me₂Si[(2-i-Pr-4,7-Me₂Ind)(2'-Et-4',5'-Benzind)]ZrCl₂,
rac-Me₂Si[(2,4-i-Pr₂Ind)(2'-Et-4',5'-Benzind)]ZrCl₂,
rac-Me₂Si[(2,4,6-i-Pr₃Ind)(2'-Et-4',5'-Benzind)]ZrCl₂,
rac-Me₂Si[(2-(1-MePr)Ind)(2'-Et-4',5'-Benzind)]ZrCl₂,
rac-Me₂Si[(2-(1-EtPr)Ind)(2'-Et-4',5'-Benzind)]ZrCl₂,
rac-Me₂Si[(2-(1-PrBu)Ind)(2'-Et-4',5'-Benzind)]ZrCl₂,
rac-Me₂Si[(2-(2-Cyclopentyl)Ind)(2'-Et-4',5'-Benzind)]ZrCl₂,
rac-Me₂Si[(2-t-BuInd)(2'-Et-4',5'-Benzind)]ZrCl₂,
rac-Me₂Si[(2-PhInd)(2'-Et-4',5'-Benzind)]ZrCl₂,
rac-Me₂Si[(2-(4-MePh)Ind)(2'-Et-4',5'-Benzind)]ZrCl₂,
rac-Et[(2-i-PrInd)(2',4',7'-Me₃Ind)]ZrCl₂,
rac-Et[(2-i-Pr-4-PhInd)(2',4',7'-Me₃Ind)]ZrCl₂,
rac-Et[(2-i-Pr-4-(1-Naph)Ind)(2',4',7'-Me₃Ind)]ZrCl₂,
rac-Et[(2-i-Pr-4-NeInd)(2',4',7'-Me₃Ind)]ZrCl₂,
rac-Et[(2-i-Pr-4,7-Me₂Ind)(2',4',7'-Me₃Ind)]ZrCl₂,
rac-Et[(2,4-i-Pr₂Ind)(2',4',7'-Me₃Ind)]ZrCl₂,
rac-Et[(2,4,6-i-Pr₃Ind)(2',4',7'-Me₃Ind)]ZrCl₂,
rac-Et[(2-(1-MePr)Ind)(2',4',7'-Me₃Ind)]ZrCl₂,
rac-Et(2-(1-EtPr)Ind)(2',4',7'-Me₃Ind)]ZrCl₂,
rac-Et[(2-(1-PrBu)Ind)(2',4',7'-Me₃Ind)]ZrCl₂,
rac-Et[(2-(2-Cyclopentyl)Ind)(2',4',7'-Me₃Ind)]ZrCl₂,
rac-Et[(2-t-BuInd)(2',4',7'-Me₃Ind)]ZrCl₂,
rac-Et[(2-PhInd)(2',4',7'-Me₃Ind)]ZrCl₂,
rac-Et[(2-(4-MePh)Ind)(2',4',7'-Me₃Ind)]ZrCl₂,
rac-Et[(2-i-PrInd)(2',7'-Me₂-4'-i-PrInd)]ZrCl₂,
rac-Et[(2-i-Pr-4-PhInd)(2',7'-Me₂-4'-i-PrInd)]ZrCl₂,
rac-Et[(2-i-Pr-4-(1-Naph)Ind)(2',7'-Me₂-4'-i-PrInd)]ZrCl₂,
rac-Et[(2-i-Pr-4-MeInd)(2',7'-Me₂-4'-i-PrInd)]ZrCl₂,
rac-Et[(2-i-Pr-4,7-Me₂Ind)(2',7'-Me₂-4'-i-PrInd)]ZrCl₂,
rac-Et[(2,4-i-Pr₂Ind)(2',7'-Me₂-4'-i-PrInd)]ZrCl₂,
rac-Et[(2,4,6-i-Pr₃Ind)(2',7'-Me₂-4'-i-PrInd)]ZrCl₂,
rac-Et[(2-(1-MePr)Ind)(2',7'-Me₂-4'-i-PrInd)]ZrCl₂,
rac-Et(2-(1-EtPr)Ind)(2',7'-Me₂-4'-i-PrInd)]ZrCl₂,
rac-Et[(2-(1-PrBu)Ind)(2',7'-Me₂-4'-i-PrInd)]ZrCl₂,
rac-Et[(2-(2-Cyclopentyl)Ind)(2',7'-Me₂-4'-i-PrInd)]ZrCl₂,
rac-Et[(2-t-BuInd)(2',7'-Me₂-4'-i-PrInd)]ZrCl₂,
rac-Et[(2-PhInd)(2',7'-Me₂-4'-i-PrInd)]ZrCl₂, and corresponding titanium compounds or hafnium compounds which contain titanium (Ti) or hafnium (Hf) in place of zirconium (Zr) in the above-mentioned compounds.

In the present invention, the metallocene compounds can be used singly or two or more of them may be used in combination.

Hereafter, representative synthetic paths for the metallocene compounds of the present invention will be described. However, the present invention shall not be construed as being limited to such synthetic paths.

Substituted indene compounds (8) as a raw material

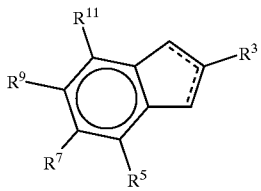
(8)

wherein the symbols have the same meanings as defined above, or substituted indene compounds (9)

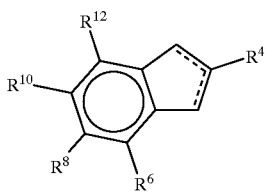
(9)

wherein the symbols have the same meanings as defined above, may be those available commercially or can be prepared in a conventional manner. In particular, introduction of substituents $R^3$ and $R^4$ in the case where $A^1$ and $A^2$ are carbon atoms can be achieved by using corresponding indanone compounds and Grignard reagent.

Deprotonation of substituted indenyl compounds (8) in a solvent with a strong base such as n-butyllithium, sodium hydride, potassium hydride, metal sodium, metal potassium or the like can afford indenyl anions (10)

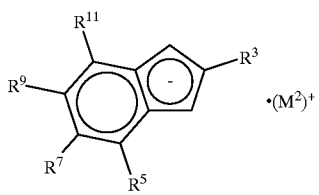
(10)

wherein $M^2$ is an alkali metal atom such as lithium, sodium, potassium or the like, and the rest symbols have the same meanings as defined above.

Reaction of the indenyl anion (10) with a compound represented by the general formula (11) below

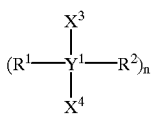
(11)

wherein $X^3$ and $X^4$, which may be the same or different, represent each a halogen atom, an OR group, a SR group, an OCOR group, an $OSO_2R$ group, or a NRR' group (where R and R' represent a hydrogen atom or a hydrocarbon group having 1 to 7 carbon atoms), and the other symbols have the same meanings as defined above, gives rise to a compound (12)

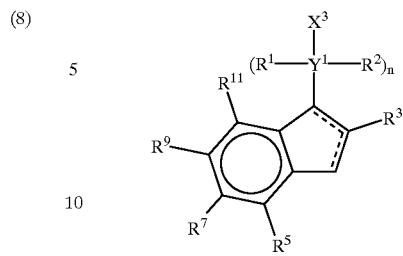
(12)

wherein symbols have the same meanings ad defined above.

The reaction can proceed at a molar ratio of compound (10): compound (11) is 1:0.5 to 1:50, particularly 1:1 to 1:20, at a substrate concentration in the ranges of 0.1 mol/liter to 10 mol/liter and at a reaction temperature in the ranges of −78° C. to 120° C. Here, it is preferred to use as a reaction solvent aliphatic hydrocarbons such as pentane, hexane, and heptane, aromatic hydrocarbons such as benzene and toluene, ethers such as diethyl ether, tetrahydrofuran (THF) and the like.

Further, reaction of the compound (12) with an indenyl anion (13) obtained by deprotonation of the substituted indene compound (9) with the above-mentioned strong base

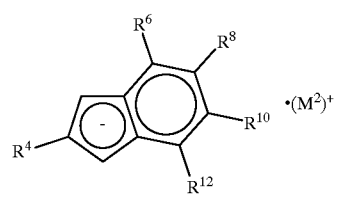
(13)

wherein $M^3$ is an alkali metal atom such as lithium, sodium, or potassium, and the other symbols have the same meanings as defined above, at a molar ratio of 1:0.5 to 1:50, particularly 1:1 to 1:20, gives rise to a compound (14)

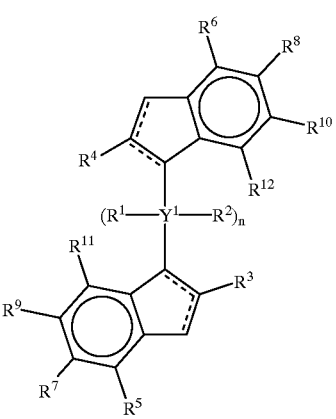
(14)

wherein symbols have the same meanings as defined above.

The reaction described above proceeds at a substrate concentration in the ranges of 0.1 mol/liter to 10 mol/liter, at a reaction temperature in the ranges of −78° C. to 120° C., particularly −20° C. to 20° C. As the reaction solvent are preferred aliphatic hydrocarbons such as pentane, hexane, and heptane, aromatic hydrocarbons such as benzene and toluene, ethers such as diethyl ether, tetrahydrofuran (THF), diisopropyl ether, and the like. When $Y^1$ is a silicon atom, use of cyan compounds such as CuCN, AgCN, BrCN, and $Hg(CN)_2$, thiocyan compounds such as (n—Bu)$_4$N$^+$SCN$^-$, amine compounds such as N,N,N',N'-tetramethylethylenediamine or the like can increase the yield of reaction (*Organometallics,* 1989, 8, 1121 ).

In the synthesis of the compound represented by the general formula (14) in which n=1 and $Y^1$ is a carbon atom, the following method for synthesis is also effective.

That is, a ketone compound (15)

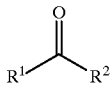

(15)

wherein symbols have the same meanings as defined above, and the substituted indene compound (9) are reacted to obtain a benzofulvene compound (16)

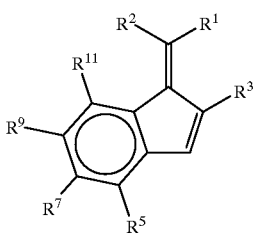

(16)

wherein symbols have the same meanings as defined above.

The reaction is carried out by allowing the substituted indene compound (9) to react with sodium ethanolate in ethanol or a strong base such as n-butyllithium, sodium hydride, potassium hydride, sodium metal or potassium metal, and then with the ketone compound (15) at a molar ratio of compound (9): compound (15) of 1:0.5 to 1:50, particularly 1:1 to 1:20.

The substituted benzofulvene compound (16) and the substituted indene compound (8) are reacted at a molar ratio of 1:0.5 to 1:50, particularly 1:1 to 1:20 to obtain a compound (17)

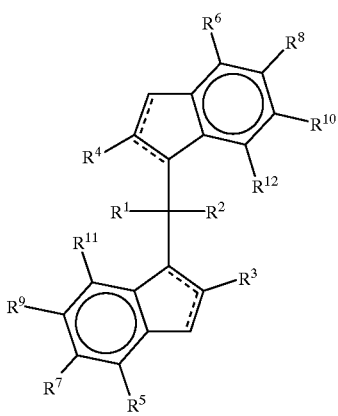

(17)

wherein symbols have the same meanings as defined above.

The compound (14) thus synthesized can be converted into a metallocene compound by a known method described in the literature (*J. Am. Chem. Soc.,* 1988, 110, 976; *J. Am. Chem. Soc.,* 1985, 107, 8103; *Organometallics,*1995, 14, 5; etc.).

That is, the compound (14) is deprotonated with the above-mentioned strong acid to obtain a dianion (18)

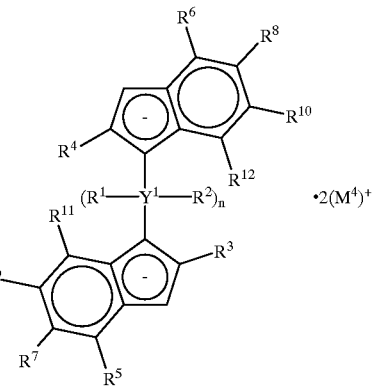

(18)

wherein $M^4$ is an alkali metal atom such as lithium, sodium, potassium, and the other symbols have the same meanings as defined above.

Then, a compound (19)

$$M^1(X^1)_n(X^2)_{4-n} \qquad (19)$$

wherein $X^1$ and $X^2$, which may be the same or different, represent each a halogen atom, an OR group, a SR group, an OCOR group, an OSO$_2$R group or NRR' group where R and R' represent each a hydrogen atom or a hydrocarbon group having 1 to 7 carbon atoms; n is an integer of 1 to 3; and the other symbols have the same meanings as defined above, is reacted with the compound (14) or the dianion (18) to obtain the metallocene compound (1) except for the case where $X^1$ and $X^2$ are each an alkyl group.

The above-mentioned reaction proceeds at a substrate concentration in the ranges of 0.1 mol/liter to 10 mol/liter and at a reaction temperature of −78° C. to 120° C., particularly −78° C. to 30° C. It is preferred to use as a reaction solvent aliphatic hydrocarbons such as pentane, hexane, and heptane, aromatic hydrocarbons such as benzene and toluene, halogenated hydrocarbon such as dichloromethane, ethers such as diethyl ether, tetrahydrofuran (THF) and the like.

In the case where $X^1$ and $X^2$ in the general formula (1) are each a hydrocarbon group, the metallocene compound represented by the general formula (1) can be synthesized by reaction with an alkylating agent represented by the general formula (20)

$$R^{33}{-}M^5 \qquad (20)$$

wherein $R^{33}$ is a hydrocarbon group having 1 to 20 carbon atoms; and $M^5$ is an alkali metal atom such as lithium, sodium, or potassium.

In the above-described synthesis reaction of the metallocene compound (1), the existence of a bulky substituent, $R^4$, at the 2-position in the general formula (1) allows advantageous production of racemic forms which can produce isotactic polypropylene (*J. Organomet. Chem.,* 369 (1989), 359).

Separation of two kinds of structural isomers (racemic and pseudo-racemic forms) can be achieved by repeating fractional recrystallization as in the case of C$_2$ symmetrical complex.

(B) Lewis Acid Compounds

The second component (B) of the catalyst for preparing polyolefins according to the present invention is a Lewis acid which is roughly grouped into two groups as follows.

One is an organoaluminoxy compound represented by the general formula (21) or (22).

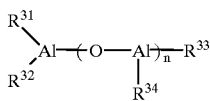
(21)

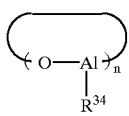
(22)

In the formulae (21) and (22), $R^{31}$, $R^{32}$, and $R^{33}$, which may be the same or different, represent each a hydrogen atom or a hydrocarbon group having 1 to 10 carbon atoms, preferably a methyl group, an ethyl group, a propyl group, a butyl group, or an isobutyl group, particularly preferably a methyl group or an isobutyl group. Plural $R^{34}$'s, which may be the same or different, are each a hydrocarbon group having 1 to 10 carbon atoms, preferably a methyl group, an ethyl group, a propyl group, a butyl group, or an isobutyl group, particularly preferably a methyl group or an isobutyl group. n is an integer of 1 to 100. Preferably, the organoaluminoxy compound comprises a mixture of those in which n is 3 to 100.

The compounds (21) and (22) may be used as mixtures thereof. The compounds of this kind can be produced by a known method. For example, there can be cited a method in which trialkylaluminum is added to a suspension of a salt having non-evaporable water (copper sulfate hydrate, aluminum sulfate hydrate or the like) in a hydrocarbon solvent, or a method in which solid, liquid or gaseous water is acted on the suspension. When n is 2 or more and $R^{34}$'s are the same, a single trialkylaluminum is used. When n is 2 or more and $R^{34}$'s are different, two or more kinds of trialkylaluminum are used or at least one trialkylaluminum and at least one dialkylaluminum monohalide are used. More specifically, the organoaluminoxy compound is selected from trialkylaluminum such as trimethylaluminum, triethylaluminum, tripropylaluminum, triisopropylaluminum, tri(n-butyl)aluminum, triisobutylaluminum, tri(s-butyl)aluminum, tri(t-butyl) aluminum, tri(pentylbutyl)aluminum, tri(hexylbutyl) aluminum, and tri(cyclo-hexylbutyl)aluminum, dialkylaluminum halides such as dimethylaluminum chloride and diisobutylaluminum chloride, dialkylaluminum aryloxide such as dimethylaluminum methoxide and the like. Among these, trialkylaluminums, particularly trimethylaluminum and tri-isobutylaluminum are preferred.

Further, the organoaluminoxy compounds used in the present invention may be reacted with a compound having an activated hydrogen such as water so that they are crosslinked product of the organoaluminoxy compounds (21) or (22). Alternatively, they may be addition products obtained by reaction with an organic polar compounds having at least one atom selected from a phosphorus atom, a nitrogen atom, a sulfur atom or an oxygen atom but having no activated hydrogen. Also, the above-described organoaluminoxy compound may contain an additive such as an alcohol in order to prevent its change with time. The organic polar compound includes trimethyl phosphate, triethyl phosphate and the like. In this case, there occurs no adhesion of polymers on the polymerization reactor wall and polyolefins having excellent powder properties can be obtained.

Another group of the second component is other Lewis acid compound which forms an ionic complex upon reaction with a metallocene compound. Among other, boron compounds are preferred. More specifically, preferred are those boron compounds which have a pentafluorophenyl group, a p-methyltetrafluorophenyl group, a p-t-butyltetrafluorophenyl group, and a p-trimethylsilyltetrafluorophenyl group, respectively. Specific examples of such compounds include tri (pentafluorophenyl)boron, tri(n-butyl)ammonium tetra-(pentafluorophenyl)borate, dimethylanilinium tetra (pentafluorophenyl)borate, pyridinium tetra (pentafluorophenyl)borate, ferrocenium tetra (pentafluorophenyl)borate, triphenylcarbenium tetra (pentafluorophenyl)borate, triphenylcarbenium tri (pentafluorophenyl)(4-methyl-2,3,5,6-tetrafluorophenyl) borate, triphenylcarbenium tri(pentafluorophenyl)(4-t-butyl-2,3,5,6-tetrafluorophenyl)-borate, triphenylcarbenium tri(pentafluorophenyl)(4-trimethylsilyl-2,3,5,6-tetrafluorophenyl)borate and the like.

(C) Organoaluminum Compound

The third component (C) of the catalyst for preparing polyolefins according to the present invention is an organoaluminum compound, which is selected from, for example, trialkylaluminums such as trimethylaluminum, triethylaluminum, tripropylaluminum, triisopropylaluminum, tri(n-butyl)aluminum, triisobutylaluminum, tri(sec-butyl)aluminum, tri(tert-butyl) aluminum, and tripentylaluminum, trihexylaluminum, trioctylaluminum, tricyclohexylaluminum, dialkylaluminum halides such as dimethylaluminum chloride, diethylaluminum chloride, and diisobutylaluminum chloride, dialkylaluminum alkoxides such as dimethylaluminum methoxide and diethylaluminum ethoxide, dialkylaluminum aryloxides such as diethylaluminum phenoxide, aluminoxane and the like. Among these, preferred are trialkylaluminums, particularly trimethylaluminum, triethylaluminum, triisobutylaluminum, and trioctylaluminum. The organoaluminoxy compounds represented by the general formula (21) or (22) may be used instead.

(D) Fine Particle Carrier

The fourth component (D) of the catalyst for preparing polyolefins according to the present invention is a fine particle carrier.

Each or all of the first to third catalyst components (A), (B), and (C) employed in the present invention can be used as carried by a fine particle carrier (hereafter, "carrier"). The fine particle carrier used in the present invention has an average particle diameter of 10 to 300 $\mu$m, preferably 20 to 200 $\mu$m. The carrier is not limited particularly as far as it is a fine particle and solid in the polymerization medium and is selected from organic and inorganic substances. Preferred examples of the inorganic substance includes inorganic oxides, chlorides, carbonates, sulfates, and hydroxides. Preferred examples of the organic substance includes organic polymers.

Examples of the inorganic carrier includes oxides such as silica and alumina, chlorides such as magnesium chloride, carbonates such as magnesium carbonate and calcium carbonate, sulfates such as magnesium sulfate and calcium sulfate, hydroxides such as magnesium hydroxide and calcium hydroxide, and the like. Examples of the organic carrier includes fine particles of organic polymers such as polyethylene, polypropylene, and polystyrene. Preferably, the carrier is an inorganic oxide, and particularly preferred are silica, alumina and their complex oxides.

Among these, porous fine particle carrier is particularly preferred since its adhesion to the inner wall of a reactor is minimum and the bulk density of the resultant polymer is high. The porous fine particle carrier used in the present invention has a specific surface area in the ranges of preferably 10 to 1,000 m²/g, more preferably 100 to 800 m²/g, and particularly 200 to 600 m²/g, and a pore volume of preferably 0.3 to 3 cm³/g, more preferably 0.5 to 2.5 cm³/g, and particularly 1.0 to 2.0 cm³/g. The carrier contains different amounts of adsorption water and of surface hydroxyl group depending on the treatment conditions. A preferred water content is no more than 5% by weight and a preferred amount of surface hydroxyl group is at least 1/nm². The water content and the amount of surface hydroxyl group can be controlled by the temperature of calcination, or by treatment with an organic aluminum compound, organic boron compound or the like.

Further, olefin prepolymers may be used.

The polymerization catalyst of the present invention may also contain in addition to the above-described components various other components useful for olefin polymerization. For example, organic metal compounds such as n-butyllithium may be used in combination in order to prevent adhesion of the resultant polymer to the wall of a polymerization reactor upon slurry polymerization.

Polymerization Method

In the present invention, olefins subjected to polyolefin polymerization includes cyclopentene, cyclohexene and the like as well as α-olefins, preferably α-olefins represented by the general formula (4)

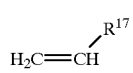

(4)

wherein $R^{17}$ is a hydrocarbon group having 1 to 6 carbon atoms, more specifically propylene, 1-butene, 1-pentene, 1-hexene, 1-heptene, 1-octene, 3-methyl-1-butene, 4-methyl-1-pentene, cyclopentene, cyclohexene, styrene, and the like. Of these, propylene is preferred.

The above-described α-olefins may be copolymerized with ethylene. Further, the polymerizations described above may be combined by a multi-step polymerization method.

The timing of contact of the first catalyst component (A) with the other catalyst components (B) to (D) may be selected optionally. For example, there can be cited a method in which the first catalyst component (A) and the second catalyst component (B) may be contacted in advance (precontacted) while the third catalyst component (C) and olefin to be polymerized are charged in a reactor, to which is added the precontacted catalyst components (A) and (B) before the polymerization reaction can be started.

Alternatively, the third catalyst component (C) and olefin to be polymerized are charged in a reactor, and the first catalyst component (A) and the second catalyst component (B) are added thereto separately before the polymerization reaction can be started. In particular, when the second catalyst component (B) is the organoaluminoxy compound represented by the general formula (21) or (22), supply of the first catalyst component (A) and the second catalyst component (B) after precontacting will increase the polymerization activity considerably.

The first to third catalyst component (A) to (C) may be borne by the fourth catalyst component (D) at appropriate time, if desired. The order of bearing the components may be selected optionally. Preferably, there is selected a method in which the fourth catalyst component (D) is first mixed with the second catalyst component (B) and further mixed with the first catalyst component (A), or a method in which the first catalyst component (A) and the second catalyst component (B) are precontacted and then mixed and contacted with the fourth catalyst component (D). The catalyst components described above may be mixed in a solvent, e.g., aromatic hydrocarbons such as benzene, toluene, and xylene, aliphatic hydrocarbons such as pentane, hexane, heptane, octane, and decane, alicyclic hydrocarbons such as cyclopentane and cyclohexane in the presence or absence of olefins. The mixing is carried out at a temperature of −70° C. to 200° C., preferably −20° C. to 120° C., for 1 minute to 600 minutes at a concentration of the first catalyst component of $10^{-6}$ to $10^{-3}$ mol per g of the fourth catalyst component (D).

The polymerization method used in the present invention may be any one of the methods known in the art such as a solution polymerization method, a slurry polymerization method, a gas phase polymerization method, or a high temperature melting polymerization method. The polymerization can be carried out continuously or discontinuously or by a single step or by multi-step.

The polymerization conditions are not limited particularly except for those limited by the process used. The polymerization temperature is 0° C. to 300° C., particularly 20° C. to 150° C., and more particularly 25° C. to 90° C.

The concentration of the catalyst component for polymerization of polyolefins according to the present invention is not limited particularly. However, it is preferred that the first catalyst component (A), i.e., metallocene compound, be in a concentration of $10^{-3}$ o $10^{-10}$ mol/liter in view of the volume of the solvent or reactor. In the case of the second catalyst component (B), the concentration of the organoaluminoxy compound represented by the general formula (21) or (22) is in the ranges of preferably 10 to 10,000, particularly 100 to 5,000, in molar ratio of (aluminum atom in the organoaluminoxy compound)/(metallocene compound) while in the case of the other Lewis acid compound, the concentration is in the ranges of preferably 0.1 to 100, particularly 0.2 to 10 in molar ratio of (Lewis acid compound)/(metallocene compound). In the case of the third catalyst component (C), the concentration is in the ranges of 10 to 100,000, preferably 100 to 10,000 in a molar ratio of the first catalyst component, i.e., metallocene compound, and the organoaluminum compound (C) ((aluminum atom in the organoaluminum)/(metallocene compound)). The organoaluminum compound used upon polymerization may be used after precontacing with the first catalyst component (A) or the second catalyst component (B) or without precontacting.

Upon polymerization, the molecular weight can be controlled by a known means, for example, selection of temperature or introduction of hydrogen.

BEST MODE FOR CARRYING OUT THE INVENTION

The present invention will be described by examples. However, the present invention shall not be construed as being limited by the following examples.

In the following examples, the metallocene compounds of the present invention were identified by the following techniques.

¹H-NMR:

Measurements were made using EX-400 manufactured by Nippon Denshi Co., Ltd. in deuterochloroform at 30° C.

Mass Analysis:

Measurements were made using AX-500 manufactured by Nippon Denshi Co., Ltd. by introducing samples by a direct method and ionizing them by electron bombarding method (70 eV).

The physical properties of polymers were measured by the following methods.

$^{13}$C-NMR:

Measurements were made using EX400 manufactured by Nippon Denshi Co., Ltd. in a mixed solvent of deuterobenzene and 1,3,5-trichlorobenzene (1:3 by weight) at 120° C. (measurement mode: proton decoupling method, pulse width: 8.0 µs, pulse repetition time: 3.0s, accumulated time: 20,000 times, internal standard: hexamethyidisiloxane, additive: Irg1010).

The stereoregularity of isotactic polypropylenes was evaluated in mmmm as an intensity ratio of signals attributable to methyl groups at 19 ppm to 23 ppm according to *Macromolecules*, 1973, 6, 925, and ibid., 1975, 8, 687.

The regioregularity of isotactic polypropylenes was evaluated in mol % as an intensity ratio of integration of signals attributable to methyne groups and methylene groups in comparison with 1,2-insertions according to *Polymer*, 1992, 33, 254, *Macromolecules*, 1988, 21, 617, and ibid., 1992, 25, 4876. Two types, i.e., racemic and meso types, of 2,1-insertions (*Polymer*, 33, 254 (1992)) were evaluated in combination as 2,1-insertions.

Gel Permeation Chromatography (GPC):

Measurements were made using Waters 150C (Shodex; GPC AT-806MS Column) in 1,2,4-trichlorobenzene at a column temperature of 135° C. at a solvent flow rate of 1 ml/minute. The molecular weight value was indicated in terms of polystyrene standard.

Differential Scanning Calorimetry (DSC):

Using Perkin Elmer DSC7, samples were heated at 230° C. followed by holding at 230° C. for 5 minutes and cooling scanning at 20° C./minute was carried out to measure heat of crystallization and then after holding the samples at 25° C. for 5 minutes a heating scanning at 20° C./minute was performed to measure heat of fusion.

The following known metallocene compounds used in comparative examples were synthesized according to the patens described below.

rac-Me$_2$Si[Ind]$_2$ZrCl$_2$ (Metallocene-B); U.S. Pat. No. 5,017, 714.

rac-Me$_2$Si[(2-MeInd)(2'-Me-4'-PhInd)]ZrCl$_2$ (Metallocene-D) ; U.S. Pat. No. 5,532,396.

rac-Me$_2$Si[(2-Me-4-PhInd)]$_2$ZrCl$_2$ (Metallocene-E); *Organometallics*, 1994, 13, 954.

EXAMPLE 1

Synthesis of rac-dimethylsilylene (2-i-propyl-1-indenyl) (1-indenyl)-zirconium dichloride (rac-Me$_2$Si[(2-i-PrInd) (Ind)]ZrCl$_2$ (Metallocene-1))

(1) 2-i-Propylindene (1-1) 3-((trimethylsilyl)oxy)indene

In a 2-liter flask were charged 38.2 g (0.378 mol) of diisopropylamine and 265 ml of tetrahydrofuran (THF). The mixture was cooled to 0° C. and 229 ml of a hexane solution of 1.65 M n-butyllithium was added thereto. After 15 minutes' stirring, the mixture turned dark brown. The solution was further cooled to −78° C., to which was added 50 ml of a THF solution of 50 g (378 mmol) of 1-indanone and the resulting mixture was stirred for 30 minutes. Then, 205 g (1.89 mol) of trimethylsilyl chloride was added at −78° C., and the coolant was removed to raise the temperature to room temperature followed by stirring for 2 hours.

The reaction solvent was filtered with a G-4 filter under nitrogen atmosphere to remove by-product salts. The separated solution was concentrated in an evaporator and the concentrate was dissolved in 100 ml of diethyl ether. After it was filtered again, the solution was concentrated in an evaporator. The concentrate was purified by distillation under reduced pressure (68 to 70° C./0.4 mmHg) to obtain the target product as a transparent oil (which crystallized at −10° C.).

Yield: 63.6 g, % yield: 82.5% (purity 98.4%). $^1$H-NMR (400 MHz, CDCl$_3$): δ0.303 (9 H, s), 3.275 (2 H, d, 2.44 Hz, allyl), 5.434 (1 H, dd, 1.90, 2.44 Hz, vinyl), 7.21 (1 H, t, 7.33 Hz), 7.29 (1 H, dd, 6.83, 7.82 Hz), 7.37–7.40 (2 H, m).

(1-2) 2-i-Propylidene-1-indanone

In a 1-liter flask were charged 23.2 g (0.4 mol) of acetone and 250 ml of methylene chloride. To the resulting mixture was added 76 g (0.40 mol) of titanium tetrachloride at 0° C. to form a yellow suspension, to which 60 g (0.294 mol) of 3-((trimethylsilyl)oxy)indene was dripped down at 0° C. The resulting mixture was stirred for 6 hours at room temperature to obtain a deep red suspension. The reaction mixture was poured into water to separate an organic layer and the aqueous layer was extracted with methylene chloride and concentrated in an evaporator.

The reaction mixture was dissolved in 300 ml of benzene and 4.2 g of p-toluenesulfonic acid monohydrate was added to the solution and refluxed for 2 hours for component distillation. The product was used in the subsequent reaction without purification.

$^1$H-NMR (400 MHz, CDCl$_3$): δ1.984 (3 H, s), 2.427 (3 H, s), 3.614 (2 H, s, allyl), 7.350 (1 H, dd, 7.32, 7.82 Hz), 7.438 (1 H, d, 7.32 Hz), 7.526 (1 H, t, 7.32 Hz), 7.788 (1 H, d, 7.82 Hz).

(1-3) 2-i-Propylindene

The reaction was carried out under nitrogen atmosphere. In a 1-liter 3-necked flask were charged 26 g (0.683 mol) of sodium borohydride and 683 ml of dry pyridine to form a transparent solution, to which was dripped down 43 mol of a pyridine solution of 47 g (0.273 mmol) of 2-i-propylidene-1-indanone. The solution turned from yellowish brown to black. Stirring was continued for 12 hours at room temperature.

The reaction solution was poured in 1.2 liters of an aqueous solution of 59 g (0.273 mmol) of potassium iodate and the mixture was stirred at room temperature for 2 hours. The resulting mixture was extracted with 500 ml of n-hexane. To the aqueous layer was added concentrated hydrochloric acid to make pH 2. The solution was extracted again with 500 ml of n-hexane. The organic layer was washed with 2N hydrochloric acid and with saline, dried over magnesium sulfate, and concentrated in an evaporator to obtain 2-i-propyl-1-indanol as a light brown oil.

2-i-Propyl-1-indanol, non-purified, was dissolved in 300 ml of benzene to which was added 5 g of p-toluenesulfonic acid monohydrate and the resulting mixture was refluxed to allow dehydration reaction to occur. After the reaction was over, the reaction mixture was washed with saline, dried over magnesium sulfate, and concentrated in an evaporator. The reaction mixture was purified by column chromatography (silica gel, development solvent: n-hexane) to fractionate the target compound.

Yield: 5.65 g (35.8 mmol), % yield: 13%. $^1$H-NMR (400 MHz, CDCl$_3$): δ1.214 (d, 6.84 Hz, 6 H, i-Pr), 2.765 (m, 6.83 Hz, 1 H, i-Pr), 3.329 (s, 2 H, allyl), 6.494 (s, 1 H, vinyl), 7.087 (t, 7.32 Hz, 1 H, aromatic), 7.205 (dd, 7.32, 8.30 Hz, 1 H, aromatic), 7.264 (d, 7.32 Hz, 1 H, aromatic), 7.370 (d, 7.32 Hz, 1 H, aromatic).

(2) Synthesis of dimethyl(1-indenyl)silyl chloride

In a 2-liter flask were charged 50 g (0.43 mol) of indene and 600 ml of dry n-hexane, to which was dripped down 270 ml of a hexane solution of 1.6 M n-butyllithium at 0° C. The mixture was stirred at room temperature for 10 hours, to which was added 111 g (0.86 mol) of dimethyidichlorosilane and the mixture was stirred as was at room temperature for 3 hours. After it was filtered through a G-4 filter, the reaction mixture was distilled under reduced pressure to remove volatile components. The crude product thus obtained was purified by distillation under reduced pressure (100° C., 7 mmHg) under argon atmosphere. As a result, 78 g of the target compound was obtained. Yield: 87%.

(3) Synthesis of dimethyl(2-i-propyl-1-indenyl)(1-indenyl) silane

In a 100-ml flask, 3.0 g (19.0 mmol) of 2-i-propylindene and 47 mg (0.523 mmol) of copper (I) cyanide were suspended in 40 ml of diethyl ether, to which was dripped down 13.0 ml of n-butyllithium (1.6 M hexane solution) at −70° C. and the mixture was slowly elevated to room temperature and stirred for 1 hour. Again the mixture was cooled to −30° C. and 40 ml of a diethyl ether solution of 4.36 g (20.9 mmol) of dimethyl(1-indenyl)silyl chloride was added thereto to obtain a dark brown suspension. Stirring was continued at room temperature for 48 hours. The reaction mixture was poured in a saturated aqueous solution of ammonium chloride under ice cooling and the organic layer was washed with 300 ml of saline three times, dried over anhydrous magnesium sulfate, and removed of the solvent by distillation to obtain the reaction mixture as a yellow oil. The reaction mixture was purified by column chromatography (silica gel, development solvent: n-hexane) to separate unreacted raw material, 2-i-propylindene, to fractionate the target compound as a yellow oil.

Yield: 4.56 g (13.8 mmol), % yield: 73%. MS (direct introduction method, EI, 70 eV): m/z 330 ($M^+$).

(4) Synthesis of $Me_2Si[(2-i-PrInd)(Ind)]ZrCl_2$ (Metallocene-1)

All the operations were performed under argon atmosphere.

In 100 ml of dry THF, 4.50 g (13.6 mmol) of dimethyl (2-i-propylindenyl)(1-indenyl)silane was dissolved. To the solution was added 18.7 ml of n-butyllithium (1.67 M hexane solution) at −78° C. After the reaction was proceeded at room temperature for 3 hours, THF was distilled off under reduced pressure. Further, while cooling at −78° C., 50 ml of dry dichloromethane was added to obtain a red solution of dilithium salt. In a 300-ml flask separately provided, 3.2 g (13.6 mmol) of zirconium tetrachloride was suspended in 100 ml of dry methylene chloride. The solution was cooled to −78° C., to which was the above-described methylene chloride solution as cooled was added using a canule. After the addition was over, the coolant was removed to slowly raise the temperature to room temperature, and the reaction mixture was stirred at room temperature for 10 hours. In the meantime, the reaction mixture turned from a deep red solution to an orange suspension.

After the reaction mixture was filtered through a G-4 filter under argon atmosphere, methylene chloride was distilled off under reduced pressure. The residue was dissolved in 200 ml of dry toluene and removed of by-produced salts by centrifugation and the supernatant was concentrated. During the concentration, crystals were deposited and the crystals were molten by heating and recrystallized at room temperature. The resulting orange crystals were confirmed to be a mixture of racemic form : pseudo-racemic form=55%:45% by $^1$H-NMR. By repeating recrystallization from toluene solutions, respective isomers were isolated as orange crystals.

$^1$H-NMR (400 MHz, $CDCl_3$) of racemic form: δ1.164 (s, 3 H), 1.172 (d, 6.35 Hz, 3 H), 1.191 (d, 6.35 Hz, 3 H), 1.284 (s, 3 H), 2.964 (septet, 6.84 Hz, 1 H), 6.044 (d, 3.42 Hz, 1 H), 6.840 (s, 1 H), 6.897 (d, 3.42 Hz, 1 H), 6.99–7.03 (m, 1 H), 7.07–7.18 (m, 1 H), 7.34–7.37 (m, 2 H), 7.49–7.61 (m, 4 H).

Mass spectrometry of racemic form (direct introduction method, EI, 70eV); m/z 490 ($M^+$).

$^1$H-NMR (400 MHz, $CDCl_3$) of pseudo-racemic form: δ1.132 (s, 3 H), 1.242 (d, 6.84 Hz, 3 H), 1.374 (s, 3 H), 1.442 (d, 6.35 Hz, 3 H), 3.058 (septet, 6.84 Hz, 1 H), 6.109 (d, 2.93 Hz, 1 H), 6.830 (s, 1 H), 6.87–6.95 (m, 2 H), 7.035 (d, 3.42 Hz, 1 H), 7.14–7.19 (m, 2 H), 7.46–7.56 (m, 4 H). Mass spectrometry of pseudo-racemic form (direct introduction method, EI, 70eV); m/z 490 ($M^+$).

Comparative Example 1

Synthesis of rac-dimethylsilylenebis(2-i-propyl-1-indenyl) zirconium dichloride (rac-$Me_2Si[2-i-PrInd]_2ZrCl_2$ (Metallocene-A)

In a 100-ml flask, 8.0 g of 2-i-propylindene and 99 mg (1.1 mmol) of copper (I) cyanide were suspended in 70 ml of diethyl ether. To this was dripped down 27.0 ml of n-butyllithium (1.67 M hexane solution) at −70° C. and the temperature was slowly elevated to room temperature and the mixture was stirred for 1 hour. The resulting solution became turbid again after copper (I) cyanide was dissolved to obtain a white suspension. Again the solution was cooled to −30° C. Addition of 23 ml of diethyl ether of 2.8 g (22.1 mmol) of dimethyldichlorosilane to the mixture turned the solution to a dark brown suspension. Stirring was continued at room temperature for 48 hours.

The reaction mixture was poured in a saturated aqueous solution of ammonium chloride under ice cooling and the organic layer was washed with 300 ml of saline three times, dried over anhydrous magnesium sulfate, and removed of the solvent by distillation to obtain the reaction mixture as a reddish brown oil. The reaction mixture was purified by column chromatography (silica gel, development solvent: n-hexane) to separate unreacted raw material, 2-i-propylindene, to fractionate the target compound as a yellow oil.

Yield: 5.5 g (14.8 mmol), % yield: 73%.

The product was confirmed to be a mixture of two isomers by $^1$H-NMR. $^1$H-NMR (400 MHz, $CDC_3$):δ−0.327 (s, 6 H, Si-Me), 1.051 (d, 6.84 Hz, 6 H, i-Pr), 1.273 (d, 6.84 Hz, 6 H, i-Pr), 2.656 (septet, 7.32 Hz, 2 H, i-Pr), 3.858 (s, 2 H, allyl), 6.618 (s, 2 H, vinyl), 7.06–7.53 (8 H, aromatic), δ−0.380 (s, 3 H, Si-Me), −0.254 (s, 3 H, Si-Me), 1.131 (d, 6.83 Hz, 6 H, i-Pr), 1.300 (d, 6.35 Hz, 6 H, i-Pr), 2.656 (septet, 7.32 Hz, 2 H, i-Pr), 3.780 (s, 2 H, allyl), 6.630 (s, 2 H, vinyl), 7.06–7.53 (8 H, aromatic).

(2) Synthesis of rac-$Me_2Si[2-i-PrInd]_2ZrCl_2$ (Metallocene-A)

All the operations were performed under argon atmosphere.

In 100 ml of dry THF was dissolved 5.87 g (15.8 mmol) of dimethylbis(2-i-propylindenyl)silane, a ligand. To the solution was added 21 ml of n-butyllithium (1.67 M hexane solution) at −78° C. After the reaction was proceeded at room temperature for 3 hours, THF was distilled off under reduced pressure. Further, while cooling at −78° C., 100 ml of dry dichloromethane was added to obtain a green suspension of dilithium salt. In a 300-ml flask separately provided, 3.68 g (15.8 mmol) of zirconium tetrachloride was suspended in 100 ml of dry methylene chloride. The solution was cooled to −78° C., to which was the above-described methylene chloride solution as cooled was added using a canule. After the addition was over, the coolant was removed to slowly raise the temperature to room temperature, and the reaction mixture was stirred at room temperature for 10 hours. In the meantime, the reaction mixture turned a deep red homogeneous solution and then deposited white solids of lithium chloride.

After the reaction mixture was removed of by-produced salts by centrifugation, methylene chloride was distilled off under reduced pressure. The residue was dissolved in 200 ml of dry toluene and centrifuged again to remove by-produced salts, and the supernatant was concentrated. During the concentration, crystals were deposited and the crystals were molten by heating and recrystallized at room temperature. As a result, orange powder crystals were obtained. The resulting orange crystals were confirmed to be of racemic form by $^1$H-NMR.

$^1$H-NMR (400 MHz, CDCl$_3$): δ1.113 (d, 6.83 Hz, 6 H), 1.138 (d, 6.84 Hz, 6 H), 1.321 (s, 6 H), 3.07–3.17 (septet, 6.84 Hz, 2 H), 6.851 (s, 2 H), 6.97–7.01 (m, 2 H), 7.13–7.35 (m, 2 H), 7.531(d, 8.30 Hz, 2 H), 7.596 (d, 8.30 Hz, 2 H).

EXAMPLE 2

Synthesis of rac-dimethylsilylene(2-i-propyl-1-indenyl)(2'-methyl-4'-phenyl-1'-indenyl)zirconium dichloride (rac-Me$_2$Si[(2-i-PrInd)(2'-Me-4'-PhInd)]ZrCl$_2$ (Metallocene-2))

(1) 2-Methyl-7-phenylindene

This was synthesized according to the known literature (*Organometallics*, 1994, 13, 954).

(2) Dimethyl(2-i-propylindenyl)(2-methyl-4-phenylindenyl)silane (2-1) Dimethyl(2-methyl-4-phenylindenyl)silyl chloride 23 g (180 mmol) of dimethyldichlorosilane was dissolved in 200 ml of dry n-hexane (dried over Na-K alloy), to which was added a solution of 2-methyl-7-phenylindenyllithium (i.e., a solution of 7.4 g (36 mmol) of 2-methyl-7-phenylindene in 70 ml of dry diethyl ether to which was dripped down 22.5 ml of a 1.6 M hexane solution of n-butyllithium at −78° C., followed by stirring at room temperature for 3 hours and by addition of 50 ml of THF) under ice cooling. The mixture was stirred as was at room temperature for 3 hours to deposit white salt of lithium chloride. After standing the mixture so that the white salt precipitated, the supernatant was extracted with a syringe and transferred into another flask and low boiling components (solvent and unreacted dimethyidichlorosilane) were distilled off under reduced pressure at 8 mmHg to obtain dimethyl(2-methyl-4-phenylindenyl)silyl chloride.

(2-2) Dimethyl(2-i-propylindenyl)(2-methyl-4-phenylindenyl)silane

In a 200-ml two-necked flask were charged 4.5 g (28.5 mmol) of 2-i-propylindene, 70.2 mg (0.78 mmol) of copper (I) cyanide, and 150 ml of diethyl ether. To the mixture was added at −78° C. 19.6 ml of 1.6 M hexane solution of n-butyllithium and the mixture was stirred at room temperature for 2 hours. Subsequently, 6.57 g (23.6 mmol) of dimethyl(2-methyl-4-phenylindenyl)silyl chloride was added at −78° C. and the mixture was stirred at room temperature for 12 hours. After addition of aqueous ammonium chloride solution to the reaction mixture, the organic layer was washed with saturated saline and dried over sodium sulfate. The sodium sulfate was removed by filtration and the organic solvent was distilled off under reduced pressure. The residue was purified by column chromatography (silica gel, development solvent: n-hexane: methylene chloride=9:1) to obtain 8.3 g (19.9 mmol, yield: 70%) of a pale yellow oil. The product was confirmed to be a mixture of two isomers by $^1$H-NMR.

$^1$H-NMR (400 MHz, CDCl$_3$); δ−0.204, −0.239, −0.271, −0.289 (s, 6 H), 1.105, 1.133, 1.304 (d, 7.32, 6.83, 6.83 Hz, 6 H), 2.153, 2.279 (s, 3 H), 2.65–2.74 (m, 1 H), 3.773, 3.848, 3.935 (s, 2 H, allyl), 6.649, 6.782, 6.819 (s, 2 H), 7.10–7.57 (m, 12 H).

(3) rac-Me$_2$Si[(2-i-PrInd)(2'-Me-4'-PhInd)]ZrCl$_2$ (Metallocene-2)

In a 500 ml two-necked flask were charged 8.3 g (19.8 mmol) of (2-isopropylindenyl)(2'-methyl-4'-phenylindenyl) silane and 130 ml of dry THF. To the mixture was added at −78° C. 27 ml of a 1.6 M hexane solution of n-butyllithium and the mixture was stirred at room temperature for 2 hours. The solvent was distilled off at room temperature. To the residue were added 100 ml of methylene chloride and 4.6 g (19.8 mmol) of zirconium tetrachloride at −78° C. and the mixture was stirred at room temperature for 10 hours. The reaction mixture was centrifuged to remove insoluble matter to obtain a transparent supernatant. After the solvent was distilled off, 50 ml of toluene was added to the residue and the solution was centrifuged again to remove insoluble matter. After the solvent was distilled off from the supernatant, 50 ml of n-hexane was added to precipitate orange powder. The orange powder was confirmed to be a mixture of two isomers (rac form, p-rac form). The production ratio was racemic form : pseudo-racemic form= 69%:31%. By repeating recrystallization from toluene solutions, respective isomers were isolated as orange crystals.

$^1$H-NMR (400 MHz, CDCl$_3$) of racemic form: δ1.086 (d,6.84 Hz, 3 H), 1.151 (d, 6.84 Hz, 3 H), 1.318 (s, 3 H), 1.327 (s, 3 H), 2.205 (s, 3 H), 3.260 (septet, 6.83 Hz, 1 H), 6.873 (s,1 H), 6.927 (s, 1 H), 6.99–7.03 (m, 1 H), 7.06–7.10 (m, 1 H), 7.31–7.35 (m, 2 H), 7.37–7.43 (m, 3 H), 7.516 (d, 8.79 Hz, 1 H), 7.58–7.61 (m, 3 H), 7.668(d, 8.30 Hz, 1 H). MS of racemic form (direct introduction method, EI, 70eV); m/Z 578 (M$^+$).

$^1$H-NMR (400 MHz, CDCl$_3$) of pseudo-racemic form: δ1.208 (d, 6.84 Hz, 3 H), 1.247 (s, 3 H), 1.465 (s, 3 H), 1.498 (d, 6.35 Hz, 3 H), 2.356 (s, 3 H), 3.137 (septet, 6.84 Hz, 1 H), 6.819 (s, 1 H), 6.828 (s, 1 H), 6.780 (dd, 7.32, 7.81, 1 H), 6.851 (dd,1.95, 6.84 Hz,1 H), 7.113 (d,6.84 Hz, 1 H), 7.30–7.44 (m,5 H), 7.550 (m, 2 H), 7.616 (d, 8.30 Hz, 1 H), 7.691 (d, 8.79 Hz, 1 H). MS of pseudo-racemic form (direct introduction method, EI, 70eV); m/Z 578 (M$^+$).

EXAMPLE 3

Synthesis of rac-dimethylsilylene(2-i-propyl-1-indenyl)(2', 7'-dimethyl-4'-i-propyl-1'-indenyl)zirconium dichloride (rac-Me$_2$Si[(2-i-PrInd)(2',7'-Me$_2$-4'-i-PrInd)]ZrCl$_2$ (Metallocene-3)

(1) 2,7-Dimethyl-4-i-propylindene (1-1) 2,7-Dimethyl-4-isopropyl-1-indanone

In a 1-liter three-necked flask equipped with a 200 ml dropping funnel were charged 87.61 g (0.66 mol) of anhydrous aluminum chloride and 150 ml of carbon disulfide, to which were added at room temperature through a dropping funnel p-cymene (47.0 ml, 0.301 mol) and methacryloyl chloride (33.0 ml, 0.338 mol) diluted with 30 ml of carbon disulfide. After stirring at room temperature for 5 hours, the reaction mixture was slowly poured on 1 kg of ice. After extraction of the reaction mixture with diethyl ether, the resulting organic layer was washed with an aqueous saturated solution of sodium hydrogen carbonate and with saline, and dried over sodium sulfate. Sodium sulfate was removed by filtration and the solvent was distilled off under reduced pressure.

(1-2) 2,7-Dimethyl-4-isopropyl-1-indanol

In a 1-liter three-necked flask equipped with a 300-ml dropping funnel and a Dimroth condenser were charged 5.00 g (0.132 mol) of lithium aluminum hydride and 300 ml of diethyl ether, to which was dripped down at 0° C. over 1.5 hours about 50 g (0.25 mol) of 2,7-dimethyl-4-isopropyl-1-indanone diluted with 200 ml of diethyl ether. After stirring at room temperature for 30 minutes, the mixture was stirred under reflux for 1.5 hours. After completion of the reaction, 10 ml of ice water and 10 ml of aqueous sodium hydroxide solution were added at 0° C. and the resulting mixture was extracted with diethyl ether. The organic layer was washed with an aqueous sodium hydrogen carbonate solution and with saline and then dried over sodium sulfate. Sodium sulfate was removed by filtration and the solvent was distilled off under reduced pressure.

(1-3) 2,7-Dimethyl-4-isopropyl-1-indene

In a 1-liter egg-plant flask were charged about 40 g (0.20 mol) of 2,7-dimethyl-4-isopropyl-indanol, 500 ml of benzene, and p-toluenesulfonic acid monohydrate and the mixture was stirred under reflux for 1 hour. The reaction mixture was poured in an aqueous sodium hydrogen carbonate solution and extracted with diethyl ether. The organic layer was washed with water and with saline and dried over sodium sulfate. Sodium sulfate was removed by filtration and the solvent was distilled off under reduced pressure. The residue was distilled under reduced pressure (69 to 74° C./0.5 mmHg) to obtain 29.06 g (0.156 mol) of 2,7-dimethyl-4-isopropylindene as a colorless liquid.

$^1$H-NMR (400 MHz, CDCl$_3$): δ1.24 (d, J=6.8 Hz, 6 H, iPr), 2.13 (s, 3 H, CH$_3$), 2.36 (s, 3 H, CH$_3$), 2.85 (sep., J=6.8 Hz, iPr), 3.25 (s, 2 H, CH$_2$), 6.52 (s, 1 H, Ind), 6.88 (s, 1 H, Ind), 7.08 ppm (s, 1 H, Ind).

(2) Dimethyl(2,7-dimethyl-4-i-propylindenyl)silyl chloride

In a three-necked flask equipped with a Dimroth condenser were charged 18.25 g (98.0 mmol) of 2,7-dimethyl-4-isopropylindene, 250 ml of n-hexane, and 50 ml of diethyl ether, and to the mixture was added at room temperature 64.0 ml of hexane solution (1.62 M) of n-butyllithium (103 mmol). Further, the mixture was stirred at room temperature for 3 hours, and under reflux for 1 hour.

In a three-necked flask equipped with a mechanical stirrer were charged 40 ml (330 mmol) of dimethyldichlorosilane and 300 ml of tetrahydrofuran, to which was added at −78° C. the above-described slurry, followed by stirring at room temperature for 3 hours. After the solvent was distilled off under reduced pressure, 100 ml of hexane was added and insoluble matter was removed by centrifugation. After the solvent was distilled off under reduced pressure, distillation under reduced pressure (126 to 129° C./3 mmHg) afforded 23.06 g (82.7 mmol, yield: 84.4%) of dimethyl(2,7-dimethyl-4-i-propylindenyl)silyl chloride as a pale yellow liquid.

$^1$H-NMR (400 MHz, CDCl$_3$): δ0.10 (s, 3 H, SiCH$_3$), 0.40 (s, 3 H, SiCH$_3$), 1.24 (d, J=7.3 Hz, 3 H, CH$_3$), 1.25 (d, J=6.8 Hz, 3 H, iPr), 2.26 (s, 3 H, CH$_3$), 2.39 (s, 3 H, CH$_3$), 2.89 (septet, J=6.8, 1 H, iPr), 3.53 (s, 1 H, Ind), 6.65 (s, 1 H, Ind), 6.89 (s, 1 H, Ind), 7.15ppm (s, 1 H, Ind).

(3) Dimethyl(2-i-propylindenyl)(2,7-dimethyl-4-i-propylindenyl)silane

In a 500-ml two-necked flask were charged 3.20 g (20.2 mmol) of 2-i-propylindene, 48.6 mg (0.54 mmol) of copper cyanide, and 100 ml of diethyl ether. To the mixture was added at −78° C. 14.0 ml of 1.62 M hexane solution of n-butyllithium (22.7 mmol) and the mixture was stirred at room temperature for 4 hours. Subsequently, 6.57 g (23.6 mmol) of dimethyl(2,7-dimethyl-4-isopropylindenyl)silyl chloride was added at −78° C. and the mixture was stirred at room temperature for 12 hours. After addition of aqueous ammonium chloride solution to the reaction mixture, the organic layer was washed with saturated saline and dried over sodium sulfate. The sodium sulfate was removed by filtration and the organic solvent was distilled off under reduced pressure. The residue was purified by column chromatography (silica gel, development solvent: n-hexane:methylene chloride=9:1) to obtain 6.85 g (17.1 mmol, yield: 84.7%) of a pale yellow oil as the target. The product was confirmed to be a mixture of isomers by $^1$H-NMR.

$^1$H-NMR (400 MHz, CDCl$_3$):δ0.32–0.38 (m, 6 H), 0.88 (t, 3 H), 1.07-1.05 (dd, 2 H), 1.34-1.20 (m, 12 H), 2.42-2.09 (m, 6 H), 2.89-2.50 (m, 2 H), 3.90-3.63 (m, 2 H), 7.50-6.58ppm (m, 8 H).

(4) rac-Me$_2$Si[(2-i-PrInd)(2'-7'-Me$_2$-4'-i-PrInd)]ZrCl$_2$ (Metallocene-3)

In a 500 ml two-necked flask were charged 2.99 g (7.46 mmol) of (2-i-propylindenyl)(2,7-dimethyl-4-isopropyl-indenyl)silane and 100 ml of dry diethyl ether. To the mixture was added at −78° C. 10.0 ml of a 1.6 M hexane solution of n-butyllithium (16.2 mmol) and the mixture was stirred at room temperature for 4 hours. After the solvent was distilled off at room temperature, the residue was washed with 100 ml of hexane. To this were added 100 ml of methylene chloride and 1.82 g (7.81 mmol) of zirconium tetrachloride at −78° C. and the mixture was stirred at room temperature for 15 hours. The reaction mixture was centrifuged to remove insoluble matter to obtain a transparent supernatant. After the solvent was distilled off, 50 ml of toluene was added to the residue and the solution was centrifuged again to remove insoluble matter. After the solvent was distilled off from the supernatant, 50 ml of n-hexane was added to precipitate orange powder. The orange powder was confirmed to be a mixture of two isomers by $^1$H-NMR. By repeating recrystallization from toluene solutions, respective isomers were isolated as orange crystals.

$^1$H-NMR (400 MHz, CDCl$_3$) of racemic form: δ1.06 (d, 6.8 Hz, 3 H), 1.15 (d, 6.8 Hz, 3 H), 1.22 (d, 6.8 Hz, 3 H), 1.23 (d, 6.8 Hz, 3 H), 1.32 (s, 3 H), 1.31 (s, 3 H), 2.22 (s, 3 H), 2.36 (s, 3 H), 2.82 (septet, 6.8 Hz, 1 H), 3.22 (septet, 6.6 Hz, 1 H), 6.69 (s, 1 H), 6.89 (s, 1 H), 7.00 (s, 1 H), 7.01 (t, 7.1 Hz, 1 H), 7.25 (s, 1 H), 7.37 (t, 7.3 Hz, 1 H), 7.52 (d, 8.8 Hz, 1 H), 7.66 (d, 8.8 Hz, 1 H). MS of racemic form (direct introduction method, EI, 70eV); m/Z 559 (M$^+$).

$^1$H-NMR (400 MHz, CDCl$_3$) of pseudo-racemic form: δ1.12 (d, 6.8 Hz, 3 H), 1.17 (d,6.8 Hz,3 H), 1.21 (d,6.8 Hz, 3 H), 1.24 (s,3 H), 1.45 (s, 3 H), 1.50 (d, 6.4 Hz, 3 H), 2.30 (s, 3 H), 2.37 (s, 3 H), 2.71 (septet, 6.8 Hz, 1 H), 3.11 (septet, 6.8 Hz, 1 H), 6.62 (s, 1 H), 6.71 (t, 7.8 Hz, 1 H), 6.77 (s, 1 H), 6.80 (s, 1H), 7.10 (t, 7.8 Hz, 1 H), 7.25 (s, 1 H), 7.43 (d, 8.8 Hz, 1 H), 7.63 (d, 8.8 Hz, 1). MS of pseudo-racemic form (direct introduction method, EI, 70eV); m/Z 559 (M$^+$).

EXAMPLE 4

Synthesis of rac-dimethylsilylene(2-i-propyl-1-indenyl)(2'-methyl-4'-(1-naphthyl)-1'-indenyl)zirconium dichloride (rac-Me$_2$Si[(2-i-PrInd)(2'-Me-4'-(1-Naph)Ind)]ZrCl$_2$ (Metallocene-4))

(1) 2-Methyl-7-(1-naphthyl)indene

This was synthesized according to the literature (*Organometallics*, 1994, 13, 954).

(2) Dimethyl(2-i-propylindene)(2-methyl-4-(1-naphthyl)indene)silane (2-1) Dimethyl (2-methyl-4-(1-naphthyl)indenyl)silyl chloride 23 g (180 mmol) of dimethyldichlorosilane was dissolved in 200 ml of dry n-hexane (dried over Na-K alloy), to which was added a solution of 2-methyl-7-(1-naphthyl) indenyllithium (i.e., a solution of 9.2 g (36 mmol) of 2-methyl-7-(1-naphthyl)indene in a mixed solvent of 75 ml of dry toluene and 5 ml of tetrahydrofuran to which was dripped down 22.5 ml of a 1.6 M hexane solution of n-butyllithium at −78° C., followed by stirring at room temperature for 3 hours and by addition of 50 ml of tetrahydrofuran) under ice cooling. The mixture was stirred as was at room temperature for 3 hours to deposit white salt of lithium chloride. After standing the mixture so that the white salt precipitated, the supernatant was extracted with a syringe and transferred into another flask and low boiling components (solvent and unreacted dimethyldichlorosilane) were distilled off under reduced pressure at 8 mmHg to obtain dimethyl(2-methyl-4-(1-naphthyl)indenyl)silyl chloride.

(2-2) Dimethyl(2-i-propylindene)(2-methyl-4-(1-naphthyl)indene)silane

Under nitrogen atmosphere, to a 100 ml of a diethyl ether solution containing 5.70 g (36.0 mmol) of 2-i-propylindene and 97 mg (0.73 mmol) of copper (I) cyanide was slowly dripped down at −78° C. 23.2 ml of a 1.6M hexane solution of n-butyllithium. The temperature was slowly elevated to room temperature and the mixture was stirred as was for 1.5 hours. Again, the mixture was cooled to −78° C., to which was slowly dripped down 60 ml of a diethyl ether solution of 12.5 g (36.0 mmol) of dimethyl(2-methyl-4-(1-naphthyl)indenyl)silyl chloride. The temperature was slowly elevated to room temperature and the mixture was stirred as was for 18 hours. After addition of an aqueous ammonium chloride solution to the reaction mixture, the organic layer was washed with saturated saline and dried over sodium sulfate. The sodium sulfate was removed by filtration and the organic solvent was distilled off under reduced pressure. The residue was purified by column chromatography (silica gel, development solvent: n-hexane : methylene chloride=10:1) to obtain the target compound. Yield: 14.7 g (29.1 mmol), % yield: 81%. The product was confirmed to be a mixture of two isomers by $^1$H-NMR. (3) rac-Me$_2$Si[(2-i-PrInd)(2'-Me-4'-(1-Naph)Ind)]ZrCl$_2$ (Metallocene-4)

Under argon atmosphere, to 120 ml of a THF solution of 7.04 g (14.9 mmol) of (2-i-propylindenyl)(2-methyl-4-(1-naphthyl)indenyl)silane synthesized as described above was slowly dripped down at −78° C. 19.2 ml of a 1.63 M hexane solution of n-butyllithium. The temperature was slowly elevated to room temperature and the mixture was stirred as was for 2 hours. After 2 hours, THF was distilled off under reduced pressure. Again the mixture was cooled to −78° C., to which was slowly added 140 ml of dry methylene chloride and then 3.43 g (14.9 mmol) of zirconium tetrachloride. The temperature was slowly elevated to room temperature and the mixture was stirred as was for 18 hours. The reaction mixture was centrifuged to remove insoluble matter and the solvent in the supernatant was distilled off. To the residue was added 200 ml of dry toluene and the solution was centrifuged again to remove insoluble matter. The supernatant was concentrated and left to stand at −100° C. overnight to obtain yellow solids (a mixture of racemic form: pseudo-racemic form=76%:24%).

$^1$H-NHR (400 MHz, CDCl$_3$): δ1.160 (d, 7.32 Hz, 3 H), 1.178 (d, 7.32 Hz, 3 H), 1.316 (s, 3 H), 1.360 (s, 3 H), 2.127 (s, 3 H), 3.311 (septet, 6.83 Hz, 1 H), 6.392 (s, 1 H), 6.947 (s, 1 H), 6.977 (dd, 7.33, 7.81 Hz, 1 H), 7.157 (dd, 1.96, 8.79 Hz, 1 H), 7.25–7.30 (m, 1 H), 7.32–7.44 (m, 3 H), 7.47–7.54 (m, 3 H), 7.666 (dd, 1.96, 8.79 Hz, 2 H), 7.83–7.88 (m, 3 H).

EXAMPLE 5

Synthesis of rac-dimethylsilylene(2-i-propyl-4-phenyl-1-indenyl)(2'-methyl-1'-indenyl)zirconium dichloride (rac-Me$_2$Si[(2-i-Pr-4-PhInd)(2'-MeInd)]-ZrCl$_2$ (Metallocene-5)

(1) 2-methylindene

This was synthesized according to the known literature (*Angew Chem. Int Ed. Engl.*, 1992, 31, 1347).

(2) Dimethyl(2-methylindenyl)silyl chloride

In a three-necked flask equipped with a Dimroth condenser were charged 15 g (115 mmol) of 2-methylindene and 200 ml of n-hexane, and to the mixture was added at room temperature 79 ml of a hexane solution (1.6 M) of n-butyllithium. Further, the mixture was stirred for 3 hours at room temperature.

In a three-necked flask equipped with a mechanical stirrer were charged 44.5 g (345 mmol) of dimethyldichlorosilane, 300 ml of tetrahydrofuran and n-hexane, to which was added at −78° C. a 2-methylindenyllithium solution, followed by stirring at room temperature for 3 hours. After the solvent was distilled off under reduced pressure, 100 ml of hexane was added and insoluble matter was removed by centrifugation. After the solvent was distilled off under reduced pressure, distillation under reduced pressure (113° C./7mmHg) afforded 14.9 g (67 mmol, yield: 58%) of dimethyl(2-methylindenyl)silyl chloride as a pale yellow liquid.

(3) Dimethyl(2-i-propyl-4-phenylindenyl)(2-methylindenyl)silane

In a 200-ml two-necked flask were charged 4.0 g (17.1 mmol) of 2-i-propyl-4-phenylindene, 42.3 mg (0.445 mmol) of copper cyanide, and 40 ml of diethyl ether. To the mixture was added at −78° C. 11.8 ml of 1.62 M hexane solution of n-butyllithium and the mixture was stirred at room temperature for 2 hours. Subsequently, 4.2 g (18.8 mmol) of dimethyl(2-methylindenyl)silyl chloride was added at −78° C. and the mixture was stirred at room temperature for 12 hours. After addition of aqueous ammonium chloride solution to the reaction mixture, the organic layer was washed with saturated saline and dried over sodium sulfate. The sodium sulfate was removed by filtration and the organic solvent was distilled off under reduced pressure. The residue was purified by column chromatography (silica gel, development solvent: hexane methylene chloride=9:1) to obtain 7.22 g (16.8 mmol, yield: 95%) of a pale yellow oil. The product was confirmed to be a mixture of two isomers by $^1$H-NMR.

$^1$H-NHR (400 MHz, CDCl$_3$): δ−0.306 (s, 3 H), −0.239 (s, 3 H), 1.114 (d, 6.84 Hz, 3 H), 1.246 (d, 6.84 Hz, 3 H), 2.266 (s, 3 H), 2.66–2.71 (septet, 1 H), 3.702 (s, 1 H, allyl), 3.921 (s, 1 H, allyl), 6.624 (s, 1 H, vinyl), 6.783 (s, 1 H, vinyl), 7.05–7.56 (m, 12 H). δ−0.288 (s, 3 H), −0.267 (s, 3 H), 1.066 (d, 7.33 Hz, 3 H), 1.246 (d, 7.33 Hz, 3 H), 2.171 (s, 3 H), 2.66–2.71 (septet, 1 H), 3.686 (s, 1 H, allyl), 3.979 (s, 1 H, allyl), 6.607 (s, H, vinyl), 6.772 (s, 1 H, vinyl), 7.05–7.56 (m, 12 H).

(4) rac-Me$_2$Si[(2-i-Pr-4-PhInd)(2'-MeInd)]ZrCl$_2$ (Metallocene-5)

Under argon atmosphere, to 70 ml of a THF solution of 7.22 g (16.8 mmol) of dimethyl(2-i-propyl-4-phenylindenyl)(2'-methylindenyl)silane was slowly dripped down at −78° C. 23.1 ml of a 1.63 M hexane solution of n-butyllithium. After completion of the dripping, the temperature was slowly elevated to room temperature and the mixture was stirred for 2 hours. After the reaction was completed, the organic solvent was distilled off under reduced pressure at room temperature to obtain viscous solids. Again the residue was cooled to −78° C. and 120 ml of dichloromethane was added and then 3.9 g (16.8 mmol) of zirconium tetrachloride. The temperature was slowly elevated to room temperature and the mixture was stirred 10 hours (during which the reaction mixture was converted to a red suspension). The reaction mixture was centrifuged and the solvent was distilled off under reduced pressure to obtain orange viscous solids. To this was added 200 ml of toluene and the solution was centrifuged again to remove insoluble matter and then the supernatant was concentrated to obtain orange fine crystals. By repeating recrystallization from toluene 3 times, the target racemic form was obtained.

$^1$H-NMR (400 MHz, CDCl$_3$): δ0.972 (d, 6.84 Hz, 3 H), 1.080 (d, 6.84 Hz, 3 H), 1.314 (s, 3 H), 1.337 (s, 3 H), 3.225 (septet, 6.83 Hz, 1 H), 6.819 (s, 1 H), 6.900 (s, 1 H), 7.007 (t, 7.81 Hz, 1 H), 7.07–7.11 (m, 1 H), 7.32–7.36 (m, 3 H), 7.40–7.43 (m, 2 H), 7.536 (d, 8.79 Hz, 1 H), 7.61 (m, 4 H).

Comparative Example 2

Synthesis of rac-dimethylsilylenebis(2-i-propyl-4-phenylindenyl) zirconium dichloride (rac-Me$_2$Si[2-i-Pr-4-PhInd]$_2$ZrCl$_2$) (Metallocene-C)

(1) 2-i-Propyl-7-phenylindene (1-1) 3-Methyl-2-(2-phenylbenzyl)butyric acid

[Addition Reaction]

In a three-necked flask were charged 16.3 g (0.134 mmol) of potassium t-butoxide, 2.4 g (24.2 mmol) of N-methylpyrrolidine, and 120 ml of toluene. While keeping the internal temperature at 60° C., 27.1 g (0.134 mol) of diethyl i-propyl malonate was dripped down. After 20 minutes from the onset of the dropping, white solids began to precipitate to give a pale sanguine suspension. After stirring was continued at 60° C. for 1 hour, 40 ml of toluene solution of 30.0 g (0.121 mol) of 2-phenylbenzyl bromide was dripped down and the mixture was refluxed for 1 hour. The toluene was distilled off under reduced pressure to obtain the target diester as a pale yellow transparent oil.

[Hydrolysis Reaction]

The diester was transferred into a 1-liter flask, to which were added 81.9 g (1.23 mol) of potassium hydroxide, 150 ml of methanol, and 50 ml of water. The mixture was refluxed for 12 hours. The reaction mixture, to which was added 200 ml of water, was rendered acidic with an aqueous sulfuric acid solution with potassium sulfate being filtered by aspiration, followed by extraction of the reaction mixture with methylene chloride. The organic layer was washed with water and dried over anhydrous sodium sulfate, and the solvent was distilled off under reduced pressure to obtain the target dicarboxylic acid as white solids (yield: 31.8 g).

[Decarboxylation Reaction]

In a 300-ml three-necked flask were charged the dicarboxylic acid, 68 ml of acetic acid, 45 ml of water and 17 ml of concentrated sulfuric acid, and the mixture was refluxed for 8 hours. After completion of the reaction, 200 ml of water was added. The mixture was extracted with 500 ml of methylene chloride. After it was washed with saline, the organic layer was dried over anhydrous sodium sulfate and the solvent was distilled off under reduced pressure. As a result, 28.6 g (0.107 mol) of white solids were obtained. The product was used in the subsequent reaction without purification.

(1-2) 3-Methyl-2-(2-phenylbenzyl)butyryl chloride

In a 500-ml three-necked flask were charged 28.6 g (0.107 mol) of 3-methyl-2-(2-phennylbenzyl)butyric acid and 53 ml (28.6g) of thionyl chloride, and the mixture was refluxed for 1.5 hours, and further stirred at room temperature for 2 hours. After completion of the reaction, excessive thionyl chloride was distilled off under reduced pressure to obtain the target compound as a pale yellow transparent oil. The product was used in the subsequent reaction without purification.

(1-3) 2-i-Propyl4-phenyl-1-indanone

In a 500-ml flask were charged 16.4 g (0.123 mol) of anhydrous aluminum chloride and 100 ml of carbon disulfide. On an ice bath was dropped a solution of 3-methyl-2-(2-phenylbenzyl)butyryl chloride and 43 ml of carbon disulfide. Simultaneously with the dropping, the reaction mixture was converted to a green suspension. After 10 hours' stirring at room temperature, the reaction mixture was converted to a violet suspension.

The reaction mixture was poured into an aqueous 1N hydrochloric acid solution containing ice, which was then extracted with 500 ml of diethyl ether. The organic layer was washed with saline until it became neutral and dried over anhydrous sodium sulfate, followed by distilling off the solvent. The reaction product was purified by column chromatography (WAKO GEL C-200; 400 g, development solvent: methylene chloride: n-hexane=2:1) to obtain the target compound. Yield: 22.4 9 (90 mmol), % yield: 73%.

$^1$H-NHR (400 MHz, CDCl$_3$): δ0.808 (d, 6.84 Hz, 3 H), 1.024 (d, 6.84 Hz, 3 H), 2.36–2.42 (m, 1 H), 2.63–2.68 (m, 1 H), 2.89–2.94 (dd, 1 H), 3.14–3.20 (dd, 1 H), 7.39–7.49 (m, 6 H), 7.572 (d, 7.81 Hz, 1 H), 7.750 (d, 7.32 Hz, 1 H).

(1-4) Synthesis of 2-i-propyl-7-phenyl-1-indene

[Reduction Reaction]

In a 500-ml flask were charged 1.78 g (47.1 mmol) of sodium boron hydride and 58 ml of anhydrous ethanol. To the mixture was dripped down 42 ml of an anhydrous ethanol solution of 22.4 g (90 mmol) of 2-i-propyl4-phenyl-1-indanone at room temperature. Then, the mixture was stirred at 50° C. for 3 hours. After completion of the reaction, 10 ml of acetone was added to decompose excessive sodium boron hydride. Under reduced pressure, the solvent was distilled off and 100 ml of an aqueous hydrochloric acid (pH=1) was added, and the mixture was extracted with diethyl ether. The organic layer was washed with saline and dried over anhydrous sodium sulfate and the solvent was distilled off to obtain 22 g of a pale yellow oil. The reaction product was used in the subsequent reaction without purification.

[Dehydration Reaction]

In a 500-ml flask were charged the above-described 2-i-propyl-7-phenyl-1-indene, 2.0 g (10.5 mmol) of p-toluenesulfonic acid monohydrate and 300 ml of benzene, and the mixture was refluxed for 1 hour. The reaction mixture was washed with saline until it became neutral and then the solvent was distilled off. The target compound was fractionated by column chromatography (silica gel, development solvent: n-hexane). Yield: 15.1 g (64.5 mmol), % yield: 71.7%.

$^1$H-NHR (400 MHz, CDCl$_3$): δ1.199 (d, 7.33 Hz, 6 H), 2.754 (septet, 6.84 Hz, 1 H), 3.408 (s, 2 H, allyl), 6.552 (s, 1 H, vinyl), 7.129 (d, 6.84 Hz, 1 H), 7.23–7.37 (m, 3 H), 7.442 (dd, 7.32, 7.82 Hz, 2 H), 7.531 (d, 7.33 Hz, 2 H).

(2) Dimethylbis(2-i-propyl-4-phenylindenyl)silane

Under nitrogen atmosphere, 24.5 ml of 1.63 M hexane solution of n-butyllithium (40 mmol) was dripped down at –78° C. into 90 ml of a diethyl ether suspension of 9.37 g (40.0 mmol) of 2-i-propyl-7-phenylindene and 0.1 g (1.0 mmol) of copper (I) cyanide. After completion of the dripping, the temperature was slowly elevated to room temperature and the mixture was stirred at room temperature for 2 hours. Again, the mixture was cooled down to –78° C. and 2.58 g (20.0 mmol) of dimethyldichlorosilane was added thereto slowly. After completion of the dripping, the temperature was slowly elevated to room temperature, and the mixture was stirred for 7 hours. The reaction mixture was poured into aqueous saturated ammonium chloride solution and extracted with diethyl ether. After it was washed with saturated saline, the organic phase was dried over anhydrous magnesium sulfate, followed by distilling off the solvent to obtain viscous solids. The solids were fractionated by column chromatography (silica gel, development solvent: n-hexane) to obtain 9.69 g (18.5 mmol, yield: 92.5%) of dimethylbis(2-i-propyl-4-phenylindenyl)silane. By $^1$H-NMR, this was confirmed to be a mixture of two isomers.

$^1$H-NHR (400 MHz, CDCl$_3$): δ–0.29, –0.20 (s, 6 H), 0.96, 1.04 (d, 6.8 Hz, 6 H), 1.09, 1.19 (d, 6.8 Hz, 6 H), 2.52, 2.63

(septet, 6.8 Hz, 2 H), 3.79, 3.84 (s, 2 H, allyl), 6.67, 6.72 (s, 2 H, vinyl), 7.07–7.48 (m, 16 H).

(3) rac-Me$_2$Si[2-i-Pr-4-PhInd]$_2$ZrCl$_2$ (Metallocene-C)

Under argon atmosphere, 12.0 ml of a 1.63 M hexane solution of n-butyllithium was dripped down at −78° C. into 70 ml of a THF solution of 4.67 g (8.90mmol) of dimethylbis(2-i-propyl-4-phenylindenyl)silane. After completion of the dripping, the temperature was slowly elevated to room temperature and the mixture was stirred for 2 hours. After the reaction was over, the solvent was distilled off under reduced pressure at room temperature to obtain viscous solids. The solids were cooled again to −78° C. and 70 ml of dichloromethane was added thereto. Subsequently, to this solution was added 2.1 g (8.90 mmol) of zirconium tetrachloride. The temperature was elevated slowly to room temperature, and the mixture was stirred for 10 hours. During this operation, the reaction mixture was converted into a red suspension. The reaction mixture was centrifuged and the solvent was distilled off under reduced pressure to obtain viscous orange solids, to which 200 ml of toluene was added and the solution was centrifuged to remove insoluble matter. The supernatant was concentrated to obtain orange fine crystals. Further, by repeating recrystallization from toluene 3 times, rac-Me$_2$Si[2-i-Pr-4-PhInd]$_2$ZrCl$_2$ (Metallocene-C), the target compound, was obtained.

$^1$H-NHR (400 MHz, CDCl$_3$): δ1.079 (d, 6.8 Hz, 3 H), 1.123 (d, 6.8 Hz, 3 H), 1.12 (d, 6.8 Hz, 6 H), 1.359 (s, 6 H), 3.201 (septet, 6.8 Hz, 2 H), 6.943 (s, 2 H), 7.07–7.11 (m, 2 H), 7.33–7.36 (m, 4 H), 7.43 (t, 7.2 Hz, 4 H), 7.60 (d, 8.8 Hz, 2 H), 7.63–7.65 (m, 4 H)

EXAMPLE 6
Polymerization of propylene

In a SUS autoclave having an inner volume of 1.5-liter, sufficiently nitrogen-purged, were charged 4.5 ml of 0.5 M toluene solution of triisobutylaluminum (TIBA) and then 8 mol of liquid propylene and the mixture was kept at 30° C. On the other hand, a 0.5 M toluene solution of TIBA (Al/Zr=500) was added to a toluene solution of 0.644 µmol of metallocene-1 (rac-Me$_2$Si[(2-i-PrInd)(Ind)]ZrCl$_2$) and allowed to react at 30° C. for 5 minutes to prepare a catalyst (catalyst A). Also, there was prepared 0.48 ml of 2.0 mM toluene solution of triphenylcarbenium tetra (pentafluorophenyl)borate [Ph$_3$C][B(C$_6$F$_5$)$_4$] (TPFPB) (catalyst B). The catalysts A and B, immediately after the mixing, were added to the reactor and polymerization was carried out at 30° C. for 30 minutes. As a result, there was obtained 79 g of isotactic polypropylene in the form of white powder. The activity per metallocene was 368 Kg-PP/mmol/Zr/hr. The resulting isotactic polypropylene had a molecular weight (Mw) of 300,000, a molecular weight distribution (Mw/Mn) of 3.14, a stereoregularity of polypropylene (mmmm) of 91.86%, and Tm of 143° C. The proportion of 2,1-insertions and 1,3-insertions were 0.12% and 0.02%, respectively.

EXAMPLE 7
Polymerization of propylene

The same procedures as in Example 6 were repeated except that the polymerization temperature was changed to 50° C. As a result, 77 g of isotactic polypropylene was obtained. The activity per metallocene was 426 Kg-PP/mmol/Zr/hr. The results obtained are arranged and shown in Tables 1 and 2.

EXAMPLE 8
Polymerization of propylene

In a SUS autoclave having an inner volume of 1.5-liter, sufficiently nitrogen-purged, were charged 4.5 ml of 0.5 M toluene solution of triisobutylaluminum (TIBA), 300 ml of toluene, and then 4 mol of liquid propylene and the mixture was kept at 30° C. On the other hand, a 0.5 M toluene solution of TIBA (Al/Zr=500) was added to a toluene solution of 0.682 µmol of metallocene-1 (rac-Me$_2$Si[(2-i-PrInd)(Ind)]ZrCl$_2$) and allowed to react at 30° C. for 5 minutes to prepare a catalyst (catalyst A). Also, there was prepared 0.51 ml of 2.0 mM toluene solution of triphenylcarbenium tetra(pentafluorophenyl)borate [Ph$_3$C][B(C$_6$F$_5$)$_4$] (TPFPB) (catalyst B). The catalysts A and B, immediately after the mixing, were added to the reactor and polymerization was carried out at 30° C. for 30 minutes. As a result, there was obtained 23 g of isotactic polypropylene. The activity per metallocene was 69 Kg-PP/mmol/Zr/hr. The results obtained are arranged and shown in Tables 1 and 2.

EXAMPLE 9
Polymerization of propylene

The same procedures as in Example 8 were repeated except that the polymerization temperature was changed to 50° C. As a result, 45 g of isotactic polypropylene was obtained. The activity per metallocene was 66 Kg-PP/mmol/Zr/hr. The results obtained are shown in Tables 1 and 2.

EXAMPLE 10
Polymerization of polypropylene

In a SUS autoclave having an inner volume of 1.5-liter, sufficiently nitrogen-purged, were charged 4.5 ml of 0.5 M toluene solution of triisobutylaluminum (TIBA), 300 ml of toluene, and then 4 mol of liquid propylene and the mixture was kept at 30° C. On the other hand, 1.4 ml of a toluene solution of methylaluminoxane (MAO)(Tosoh Akzo, 0.5 mol/ml as Al) was added to a toluene solution of 0.682 µmol of metallocene-1 (rac-Me$_2$Si[(2-i-PrInd) (Ind)]ZrCl$_2$) and allowed to react at 30° C. for 5 minutes. Thereafter, the catalyst solution was added to the reactor and polymerization was carried out at 30° C. for 30 minutes. As a result, there was obtained 18 g of isotactic polypropylene. The activity per metallocene was 48 Kg-PP/mmol/Zr/hr. The results obtained are shown in Tables 1 and 2.

EXAMPLE 11
Polymerization of propylene

The same procedures as in Example 10 were repeated except that the polymerization temperature was changed to 50° C. As a result, 53 g of isotactic polypropylene was obtained. The activity per metallocene was 77 Kg-PP/mmol/Zr/hr. The results obtained are shown in Tables 1 and 2.

Comparative Examples 3 to 8
Polymerization of propylene

The same procedures as in Examples 6 to 11 were repeated except that metallocene-A (rac-Me$_2$Si[2-i-PrInd]$_2$ZrCl$_2$) was used instead of metallocene-1. Results obtained are shown in Tables 1 and 2.

Comparative Example 9
Polymerization of propylene

The same procedures as in Example 6 were repeated except that metallocene-B (rac-Me$_2$Si[Ind]$_2$ZrCl$_2$) was used instead of metallocene-1. Results obtained are shown in Tables 1 and 2.

TABLE 1

| | Metallocene | Propylene mol | Promoter | Polymerization Temperature °C. | Polymerization Time min | Zr µmol | Yield g | Activity Kg-PP/mmol-Zr/h |
|---|---|---|---|---|---|---|---|---|
| Example 6 | 1 | 8 | TPFPB | 30 | 20 | 0.644 | 79 | 368 |
| Comparative Example 3 | A | 8 | TPFPB | 30 | 12 | 10.00 | 6 | 3 |
| Comparative Example 9 | B | 8 | TPFPB | 30 | 20 | 0.511 | 91 | 534 |
| Example 7 | 1 | 8 | TPFPB | 50 | 6 | 1.800 | 77 | 426 |
| Comparative Example 4 | A | 8 | TPFPB | 50 | 10 | 10.00 | 23 | 14 |
| Example 8 | 1 | 4 | TPFPB | 30 | 30 | 0.682 | 23 | 69 |
| Comparative Example 5 | A | 4 | TPFPB | 30 | 30 | 9.500 | 13 | 17 |
| Example 9 | 1 | 4 | TPFPB | 50 | 60 | 0.682 | 45 | 66 |
| Comparative Example 6 | A | 4 | TPFPB | 50 | 30 | 9.500 | 69 | 7 |
| Example 10 | 1 | 4 | MAO | 30 | 30 | 0.682 | 18 | 48 |
| Comparative Example 7 | A | 4 | MAO | 30 | 22 | 10.00 | 65 | 18 |
| Example 11 | 1 | 4 | MAO | 50 | 60 | 0.682 | 53 | 77 |
| Comparative Example 8 | A | 4 | MAO | 50 | 30 | 10.00 | 88 | 18 |

TABLE 2

| | Metallocene | Mw ×10$^4$ | Mw/Mn | mmmm % | 2,1 mol % | 1,3 mol % | Tm °C. |
|---|---|---|---|---|---|---|---|
| Example 6 | 1 | 30 | 3.14 | 91.86 | 0.12 | 0.02 | 143 |
| Comparative Example 3 | A | 46 | 2.55 | 88.46 | 0.00 | 0.00 | 132 |
| Comparative Example 9 | B | 5 | 2.65 | 92.46 | 0.41 | 0.03 | 140 |
| Example 7 | 1 | 51 | 2.96 | 91.26 | 0.15 | 0.04 | 142 |
| Comparative Example 4 | A | 5 | 2.98 | 83.08 | 0.00 | 0.03 | 100 |
| Example 8 | 1 | 71 | 3.14 | 91.30 | 0.09 | 0.02 | 142 |
| Comparative Example 5 | A | 17 | 3.19 | 83.11 | 0.00 | 0.00 | 115 |
| Example 9 | 1 | 12 | 2.00 | 90.85 | 0.12 | 0.07 | 141 |
| Comparative Example 6 | A | 4 | 2.11 | 72.24 | 0.00 | 0.00 | — |
| Example 10 | 1 | 72 | 2.38 | 92.02 | 0.13 | 0.02 | 142 |
| Comparative Example 7 | A | 41 | 2.60 | 84.36 | 0.00 | 0.00 | 119 |
| Example 11 | 1 | 35 | 2.26 | 89.96 | 0.14 | 0.04 | 140 |
| Comparative Example 8 | A | 12 | 2.03 | 76.38 | 0.00 | 0.01 | 87 |

Comparing Example 6 with Comparative Examples 3 and 9, it will be apparent that upon polymerization of propylene with a catalyst containing the metallocene compound of the present invention (metallocene-1) as a catalyst component, isotactic polypropylene having well balanced stereoregularity and regioregularity and thus a high melting point as compared with corresponding C$_2$ symmetrical type metallocene compounds (metallocene-A and metallocene-B).

EXAMPLE 12
Polymerization of propylene

In a SUS autoclave having an inner volume of 1.5-liter, sufficiently nitrogen-purged, were charged 4.5 ml of 0.5 M toluene solution of triisobutylaluminum (TIBA) and then 8 mol of liquid propylene and the mixture was kept at 30° C. On the other hand, 0.27 ml of a 0.5 M toluene solution of TIBA was added to a toluene solution of 0.27 µmol of metallocene-2 (rac-Me$_2$Si[(2-i-PrInd)(2'-Me-4'-PhInd)] ZrCl$_2$) and allowed to react at 30° C. for 5 minutes to prepare a catalyst (catalyst A). Also, there was prepared 0.20 ml of 2.0 mM toluene solution of triphenylcarbenium tetra (pentafluorophenyl)borate [Ph$_3$C][B(C$_6$F$_5$)$_4$] (TPFPB) (catalyst B). The catalysts A and B, immediately after the mixing, were added to the reactor and polymerization was carried out at 30° C. for 10 minutes. As a result, there was obtained 21 g of isotactic polypropylene in the form of white powder. The activity per metallocene was 467 Kg-PP/mmol-Zr/hr. The resulting isotactic polypropylene had a molecular weight (Mw) of 2,560,000, a molecular weight distribution (Mw/Mn) of 2.14, a stereoregularity of polypropylene (mmmm) of 99.33%, and Tm of 161° C. The proportion of 2,1-insertions and 1,3-insertions were 0.02% and 0.00%, respectively.

EXAMPLE 13
Polymerization of propylene

The same procedures as in Example 12 were repeated except that the polymerization temperature was changed to 50° C. As a result, 16 g of isotactic polypropylene was obtained. The activity per metallocene was 408 Kg-PP/mmol/Zr/hr. The results obtained are arranged and shown in Tables 3 and 4.

EXAMPLE 14
Polymerization of propylene

In a SUS autoclave having an inner volume of 1.5-liter, sufficiently nitrogen-purged, were charged 4.5 ml of 0.5 M toluene solution of triisobutylaluminum (TIBA), 300 ml of toluene, and then 4 mol of liquid propylene and the mixture was kept at 30° C. On the other hand, a 0.5 M toluene solution of TIBA (Al/Zr=500) was added to a toluene solution of 0.682 µmol of metallocene-2 (rac-Me$_2$Si[(2-i-PrInd)(2'-Me-4'-PhInd)]ZrCl$_2$) and allowed to react at 30° C. for 5 minutes to prepare a catalyst (catalyst A). Also, there was prepared 0.51 ml of 2.0 mM toluene solution of triphenylcarbenium tetra(pentafluorophenyl)borate [Ph$_3$C][B (C$_6$F$_5$)$_4$] (TPFPB) (catalyst B). The catalysts A and B, immediately after the mixing, were added to the reactor and polymerization was carried out at 30° C. for 10 minutes. As a result, there was obtained 4 g of isotactic polypropylene.

The activity per metallocene was 110 Kg-PP/mmol/Zr/hr. The results obtained are arranged and shown in Tables 3 and 4.

EXAMPLE 15
Polymerization of propylene

The same procedures as in Example 14 were repeated except that the polymerization temperature was changed to 50° C. As a result, 29 g of isotactic polypropylene was obtained. The activity per metallocene was 460 Kg-PP/mmol/Zr/hr. The results obtained are shown in Tables 3 and 4.

EXAMPLE 16
Polymerization of propylene

In a SUS autoclave having an inner volume of 1.5-liter, sufficiently nitrogen-purged, were charged 4.5 ml of 0.5 M toluene solution of triisobutylaluminum (TIBA), 300 ml of toluene, and then 4 mol of liquid propylene and the mixture was kept at 30° C. On the other hand, 1.4 ml of a toluene solution of methylaluminoxane (MAO)(Tosoh Akzo, 0.5 mol/ml as Al) was added to a toluene solution of 0.682 µmol of metallocene-2 (rac-Me$_2$Si[(2-i-PrInd)(2'-Me-4'-PhInd)]ZrCl$_2$) and allowed to react at 30° C. for 5 minutes. Thereafter, the catalyst solution was added to the reactor and polymerization was carried out at 30° C. for 15 minutes. As a result, there was obtained 36 g of isotactic polypropylene. The activity per metallocene was 555 Kg-PP/mmol/Zr/hr. The results obtained are shown in Tables 3 and 4.

EXAMPLE 17
Polymerization of propylene

The same procedures as in Example 16 were repeated except that the polymerization temperature was changed to 50° C. As a result, 13 g of isotactic polypropylene was obtained. The activity per metallocene was 242 Kg-PP/mmol/Zr/hr. The results obtained are shown in Tables 3 and 4.

EXAMPLES 18 TO 23
Polymerization of propylene

The same procedures as in Examples 12 to 17 were repeated except that metallocene-3 (rac-Me$_2$Si[(2-i-PrInd)(2',7'-Me$_2$-4'-i-PrInd)]ZrCl$_2$) was used instead of metallocene-2. Results obtained are shown in Tables 3 and 4.

EXAMPLES 24 TO 29
Polymerization of propylene

The same procedures as in Examples 12 to 17 were repeated except that metallocene4 (rac-Me$_2$Si[(2-i-PrInd)(2'-Me$_2$-4'-(1-Naph)Ind)]ZrCl$_2$) was used instead of metallocene-2. Results obtained are shown in Tables 3 and 4.

EXAMPLE 30 TO 35
Polymerization of propylene

The same procedures as in Examples 12 to 17 were repeated except that metallocene-5 (rac-Me$_2$Si[(2-i-Pr-4-PhInd)(2'-MeInd)]ZrCl$_2$) was used instead of metallocene-2. Results obtained are shown in Tables 3 and 4.

Comparative Examples 10 to 15
Polymerization of propylene

The same procedures as in Examples 12 to 17 were repeated except that metallocene-C (rac-Me$_2$Si[2-i-Pr-4-PhInd]$_2$ZrCl$_2$) was used instead of metallocene-2. Results obtained are shown in Tables 3 and 4.

Comparative Examples 16 and 17
Polymerization of propylene

The same procedures as in Examples 12 to 17 were repeated except that metallocene-D (rac-Me$_2$Si[(2-MeInd)(2'-Me-4'-PhInd)]ZrCl$_2$) was used instead of metallocene-2. Results obtained are shown in Tables 3 and 4.

TABLE 3(1)

|  | Metallocene | Propylene mol | Promoter | Polymerization Temperature ° C. | Polymerization Time min | Zr µmol | Yield g | Activity Kg-PP/mmol-Zr/h |
|---|---|---|---|---|---|---|---|---|
| Example 12 | 2 | 8 | TPFPB | 30 | 10 | 0.27 | 21 | 467 |
| Example 18 | 3 | 8 | TPFPB | 30 | 5 | 1.00 | 15 | 197 |
| Example 24 | 4 | 8 | TPFPB | 30 | 10 | 0.50 | 10 | 122 |
| Example 30 | 5 | 8 | TPFPB | 30 | 20 | 1.00 | 22 | 66 |
| Comparative Example 10 | C | 8 | TPFPB | 30 | 15 | 2.00 | 38 | 77 |
| Comparative Example 16 | D | 8 | TPFPB | 30 | 10 | 0.43 | 32 | 458 |
| Example 13 | 2 | 8 | TPFPB | 50 | 10 | 0.24 | 16 | 408 |
| Example 19 | 3 | 8 | TPFPB | 50 | 30 | 1.00 | 36 | 72 |
| Example 25 | 4 | 8 | TPFPB | 50 | 10 | 0.50 | 14 | 163 |
| Example 31 | 5 | 8 | TPFPB | 50 | 10 | 1.00 | 17 | 99 |
| Comparative Example 11 | C | 8 | TPFPB | 50 | 15 | 2.00 | 36 | 72 |
| Comparative Example 17 | D | 8 | TPFPB | 50 | 14 | 0.27 | 45 | 707 |
| Example 14 | 2 | 4 | TPFPB | 30 | 10 | 0.20 | 4 | 110 |
| Example 20 | 3 | 4 | TPFPB | 30 | 18 | 1.00 | 9 | 28 |
| Example 26 | 4 | 4 | TPFPB | 30 | 10 | 0.50 | 12 | 146 |
| Example 32 | 5 | 4 | TPFPB | 30 | 15 | 1.00 | 14 | 55 |
| Comparative Example 12 | C | 4 | TPFPB | 30 | 30 | 2.00 | 75 | 75 |

TABLE 3(2)

| | Metallocene | Propylene mol | Promoter | Polymerization Temperature °C. | Polymerization Time min | Zr μmol | Yield g | Activity Kg-PP/mmol-Zr/h |
|---|---|---|---|---|---|---|---|---|
| Example 15 | 2 | 4 | TPFPB | 50 | 14 | 0.27 | 29 | 460 |
| Example 21 | 3 | 4 | TPFPB | 50 | 15 | 1.00 | 13 | 52 |
| Example 27 | 4 | 4 | TPFPB | 50 | 10 | 0.50 | 21 | 242 |
| Example 33 | 5 | 4 | TPFPB | 50 | 25 | 1.00 | 67 | 160 |
| Comparative Example 13 | C | 4 | TPFPB | 50 | 30 | 2.00 | 85 | 85 |
| Example 16 | 2 | 4 | MAO | 30 | 15 | 0.24 | 36 | 555 |
| Example 22 | 3 | 4 | MAO | 30 | 15 | 1.00 | 25 | 101 |
| Example 28 | 4 | 4 | MAO | 30 | 10 | 0.50 | 10 | 124 |
| Example 34 | 5 | 4 | MAO | 30 | 10 | 1.00 | 26 | 158 |
| Comparative Example 14 | C | 4 | MAO | 30 | 30 | 2.00 | 32 | 32 |
| Example 17 | 2 | 4 | MAO | 50 | 13 | 0.24 | 13 | 242 |
| Example 23 | 3 | 4 | MAO | 50 | 10 | 1.00 | 13 | 81 |
| Example 29 | 4 | 4 | MAO | 50 | 10 | 0.50 | 18 | 300 |
| Example 35 | 5 | 4 | MAO | 50 | 10 | 1.00 | 25 | 151 |
| Comparative Example 15 | C | 4 | MAO | 50 | 30 | 2.00 | 30 | 30 |

TABLE 4(1)

| | Metallocene | Mw ×10$^4$ | Mw/Mn | mmmm % | 2,1 mol % | 1,3 mol % | Tm °C. |
|---|---|---|---|---|---|---|---|
| Example 12 | 2 | 256 | 2.14 | 99.33 | 0.02 | 0.00 | 162 |
| Example 18 | 3 | 193 | 1.95 | 98.51 | 0.00 | 0.00 | 161 |
| Example 24 | 4 | 243 | 2.13 | 99.80 | 0.00 | 0.00 | 164 |
| Example 30 | 5 | 209 | 2.19 | 95.33 | 0.18 | 0.00 | 148 |
| Comparative Example 10 | C | 80 | 2.32 | 99.17 | 0.00 | 0.04 | 160 |
| Comparative Example 16 | D | 103 | 2.85 | 99.08 | 0.21 | 0.00 | 158 |
| Example 13 | 2 | 89 | 2.56 | 98.82 | 0.03 | 0.01 | 160 |
| Example 19 | 3 | 55 | 2.36 | 97.17 | 0.08 | 0.00 | 155 |
| Example 25 | 4 | 89 | 2.45 | 99.25 | 0.04 | 0.01 | 161 |
| Example 31 | 5 | 80 | 2.45 | 94.86 | 0.21 | 0.01 | 145 |
| Comparative Example 11 | C | 28 | 2.59 | 98.32 | 0.00 | 0.04 | 157 |
| Comparative Example 17 | D | 66 | 2.73 | 98.79 | 0.28 | 0.00 | 155 |
| Example 14 | 2 | 266 | 2.24 | 99.42 | 0.02 | 0.00 | 162 |
| Example 20 | 3 | 224 | 1.81 | 98.70 | 0.00 | 0.00 | 161 |
| Example 26 | 4 | 256 | 1.85 | 99.76 | 0.02 | 0.01 | 163 |
| Example 32 | 5 | 200 | 2.24 | 95.56 | 0.16 | 0.00 | 149 |
| Comparative Example 12 | C | 39 | 2.24 | 98.71 | 0.00 | 0.02 | 159 |

TABLE 4(2)

| | Metallocene | Mw ×10$^4$ | Mw/Mn | mmmm % | 2,1 mol % | 1,3 mol % | Tm °C. |
|---|---|---|---|---|---|---|---|
| Example 15 | 2 | 67 | 1.87 | 98.76 | 0.03 | 0.02 | 159 |
| Example 21 | 3 | 46 | 2.79 | 96.59 | 0.05 | 0.00 | 156 |
| Example 27 | 4 | 56 | 2.27 | 98.98 | 0.03 | 0.01 | 161 |
| Example 33 | 5 | 89 | 2.94 | 94.88 | 0.20 | 0.04 | 146 |
| Comparative Example 13 | C | 10 | 2.02 | 96.70 | 0.00 | 0.03 | 153 |
| Example 16 | 2 | >300 | — | 99.39 | 0.02 | 0.00 | 161 |
| Example 22 | 3 | 159 | 2.02 | 97.68 | 0.04 | 0.00 | 156 |
| Example 28 | 4 | >300 | — | 99.61 | 0.02 | 0.00 | 162 |
| Example 34 | 5 | 179 | 2.14 | 96.96 | 0.17 | 0.00 | 150 |
| Comparative Example 14 | C | 61 | 3.26 | 99.03 | 0.00 | 0.04 | 159 |
| Example 17 | 2 | 145 | 2.44 | 98.89 | 0.04 | 0.02 | 159 |
| Example 23 | 3 | 76 | 2.45 | 94.36 | 0.05 | 0.02 | 153 |
| Example 29 | 4 | 120 | 2.32 | 98.95 | 0.04 | 0.03 | 160 |
| Example 35 | 5 | 78 | 2.02 | 96.75 | 0.17 | 0.07 | 148 |
| Comparative Example 15 | C | 13 | 1.92 | 97.58 | 0.00 | 0.05 | 155 |

From the results in Tables 3 and 4, it can be seen that use of a series of compounds having a substituent on the 4'-position of the indene ring from among the metallocene compounds of the present invention as a component for a catalyst for polymerization of propylene results in a further control of regioselectivity and regioregularity as compared with the conventional metallocene compounds so that high melting point isotactic polypropylene can be produced.

Furthermore, comparing with the use of metallocene compound rac-Me$_2$Si[2-i-Pr-4-PhInd]$_2$ZrCl$_2$ (metallocene-C) as a catalyst component, it will be apparent that the metallocene compounds whose substituents at the 2- and 2'-positions are each a secondary hydrocarbon group are inferior in activity, molecular weight, and stereoregularity (mmmm) to the use of the metallocene compounds as a catalyst component although the former has less regiodefects.

EXAMPLE 36

Synthesis of rac-dimethylsilylene(2-i-propyl-4-phenyl-1-indenyl)(2'-methyl-4'-phenyl-1'-indenyl)zirconium chloride (rac-Me$_2$Si[(2-i-Pr-4-PhInd)(2'-Me-4'-PhInd)]ZrCl$_2$ (metallocene-6))

(1) Dimethyl(2-i-propyl-4-phenylindenyl)(2-methyl-4-phenylindenyl)silane

In a 200-ml two-necked flask were charged 7.38 g (31.5 mmol) of 2-i-propyl-4-phenylindene, 55.3 mg (0.618 mmol) of copper cyanide and 100 ml of dry diethyl ether. To the mixture was added at −78° C., 22.0 ml of 1.62 M hexane solution of n-butyllithium (35.2 mmol) and the mixture was stirred at room temperature for 2 hours. Subsequently, 8.46 g (28.3 mmol) of dimethyl(2-methyl-4-phenylindenyl)silyl chloride was added at −78° C. and the mixture was stirred at room temperature for 12 hours. After it was poured into aqueous ammonium chloride, the reaction mixture was extracted with diethyl ether. The organic layer was washed with saturated saline and dried over sodium sulfate. The sodium sulfate was removed by filtration and the organic solvent was distilled off under reduced pressure. The residue was purified by column chromatography (silica gel, eluent: n-hexane, methylene chloride) to obtain 10.93 g (22.0 mmol, yield: 77.7%) of a pale yellow liquid. The product was confirmed to be a mixture of two isomers by $^1$H-NMR.

$^1$H-NHR (400 MHz, CDCl$_3$): δ−0.217, −0.159, −0.153 (s, 6 H), 1.070, 1.112, 1.198, 1.252 (d,6.84, 7.32, 6.35, 6.83 Hz, 6 H), 1.544 (s,2 H), 2.106, 2.268 (s, 3 H), 2.68 (m, 1 H), 6.762, 6.789, 6.812 (s, 2 H), 7.13–7.56 (m, 16 H).

(2) (rac-Me$_2$Si[(2-i-Pr-4-PhInd)(2'-Me-4'-PhInd)]ZrCl$_2$ (Metallocene-6)

In a 500 ml two-necked flask were charged 5.60 g (11.3 mmol) of dimethyl(2-i-propyl4-phenylindenyl)(2-methyl-4-phenylindenyl)silane and 100 ml of dry diethyl ether. To the mixture was added at −78° C., 17.0 ml of a 1.62 M hexane solution of n-butyllithium (27.5 mmol) and the mixture was stirred at room temperature for 4 hours. After the solvent was distilled off, there were added 100 ml of methylene chloride and 2.71 g (11.6 mmol) of zirconium tetrachloride at −78° C. and the mixture was stirred at room temperature for 15 hours. The solvent was distilled off, and 100 ml of dry toluene was added, followed by stirring at 80° C. for 10 minutes. After cooling to room temperature, the solution was centrifuged to remove insoluble matter and the supernatant was concentrated. The concentrate was stored overnight in a refrigerator to obtain orange powder. The orange powder was confirmed to be a mixture of two isomers (rac form, p-rac form). By repeating recrystallization from toluene solutions, only the racemic form was isolated as orange crystals.

$^1$H-NMR (400 MHz, CDCl$_3$): δ1.051 (d, 6.83 Hz, 3 H), 1.124 (d, 6.84 Hz, 3 H), 1.360 (s, 3 H), 1.368 (s, 3 H), 2.275 (s, 3 H), 3.287 (septet, 6.84 Hz, 1 H), 6.948 (s, 1 H), 6.970 (s, 1 H), 7.110 (d, 6.84 Hz, 1 H), 7.132 (d, 6.84 Hz, 1 H), 7.40-7.35 (m, 4 H), 7.442 (t, 7.57 Hz, 2 H), 7.447 (t, 7.57 Hz, 2 H), 7.70-7.62 (m, 6 H).

EXAMPLE 37 TO 40

Polymerization of propylene

The same procedures as in Examples 12 to 15 were repeated except that metallocene-6 (rac-Me$_2$Si[(2-i-Pr-4-PhInd)(2'-Me-4'-PhInd)]ZrCl$_2$) was used instead of metallocene-2. Results obtained are shown in Tables 5 and 6.

COMPARATIVE EXAMPLES 18 TO 19

Polymerization of propylene

The same procedures as in Examples 38 and 40 were repeated except that metallocene-E (rac-Me$_2$Si[2-Me-4-PhInd]$_2$ZrCl$_2$) was used instead of metallocene-6. Results obtained are shown in Tables 5 and 6.

TABLE 5

|  | Metallocene | Propylene mol | Promoter | Polymerization Temperature ° C. | Polymerization Time min | Zr μmol | Yield g | Activity Kg-PP/mmol-Zr/h |
| --- | --- | --- | --- | --- | --- | --- | --- | --- |
| Example 37 | 6 | 8 | TPFPB | 30 | 7 | 0.400 | 15 | 317 |
| Comparative Example 18 | E | 8 | TPFPB | 30 | 10 | 0.20 | 12 | 360 |
| Example 38 | 6 | 8 | TPFPB | 50 | 14 | 0.400 | 32 | 343 |
| Comparative Example 19 | E | 8 | TPFPB | 50 | 10 | 0.20 | 22 | 660 |
| Example 39 | 6 | 4 | TPFPB | 30 | 16 | 0.400 | 29 | 272 |
| Example 40 | 6 | 4 | TPFPB | 50 | 10 | 0.400 | 44 | 660 |

TABLE 6

|  | Metallocene | Mw ×10$^4$ | Mw/Mn | mmmm % | 2,1 mol % | 1,3 mol % | Tm ° C. |
| --- | --- | --- | --- | --- | --- | --- | --- |
| Example 37 | 6 | 270 | 2.52 | 99.64 | 0.04 | 0.00 | 162 |
| Comparative Example 18 | E | >300 | — | 99.99 | 0.19 | 0.00 | 161 |
| Example 38 | 6 | 95 | 1.90 | 99.50 | 0.09 | 0.00 | 160 |
| Comparative Example 19 | E | 230 | 1.79 | 99.99 | 0.25 | 0.00 | 159 |

TABLE 6-continued

|  | Metallocene | Mw ×10⁴ | Mw/Mn | mmmm % | 2,1 mol % | 1,3 mol % | Tm ° C. |
|---|---|---|---|---|---|---|---|
| Example 39 | 6 | 114 | 2.32 | 99.60 | 0.05 | 0.00 | 161 |
| Example 40 | 6 | 45 | 2.65 | 99.50 | 0.09 | 0.01 | 160 |

INDUSTRIAL APPLICABILITY

Use of a catalyst for polymerizing olefins which contains as a catalyst component a novel metallocene compound according to the present invention enables one to prepare high rigid, high melting point isotactic polypropylene useful as an industrial material for automobiles and the like, more specifically isotactic polypropylene having highly controlled stereoregularity and regioregularity, particularly the one having a high regioregularity that has been difficult to achieve with conventional metallocene catalysts.

What is claimed is:

1. A catalyst compound for polyolefin production catalysts, comprising a metallocene compound represented by general formula (1)

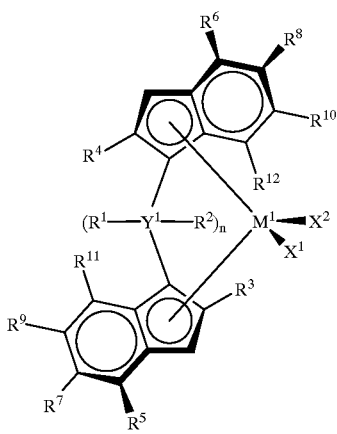

(1)

wherein $M^1$ is a transient metal atom selected from the group consisting of Ti, Zr, and Hf; $X^1$ and $X^2$, which are the same or different, each represent a hydrogen atom, a halogen atom, a hydrocarbon group having 1 to 20 carbon atoms which may contain a halogen atom, an OR group, a SR group, an OCOR group, a SO₂R group, an OSO₂R group or a NRR' group, where R and R', which are the same or different, each represent a hydrogen atom or a hydrocarbon group having 1 to 7 carbon atoms which may contain a halogen atom;

$R^1$ and $R^2$, which are the same or different, each represent a hydrogen atom, a hydrocarbon group having 1 to 20 carbon atoms, an OR'' group or a SR'' group, where R'' is a hydrogen atom or a hydrocarbon group having 1 to 7 carbon atoms, or combine to form a ring;

$R^3$ is a hydrogen atom, or a group represented by the general formula (2)

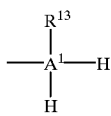

(2)

wherein $A^1$ is a carbon atom or a silicon atom; $R^{13}$ is a hydrogen atom, a halogen atom or a hydrocarbon group having 1 to 7 carbon atoms which may contain a halogen atom;

$R^4$ is a group represented by the general formula (3)

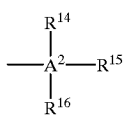

(3)

wherein $A^2$ is a carbon atom or a silicon atom; $R^{14}$ to $R^{16}$, which are the same or different, each represent a hydrogen atom, a halogen atom, or a hydrocarbon group having 1 to 7 carbon atoms which may contain a halogen atom, provided that two or more of $R^{14}$ to $R^{16}$ are not a hydrogen atom simultaneously; or $R^{14}$ to $R^{16}$ may together with $A^2$ combine to form a ring;

$R^5$ to $R^{12}$, which are the same or different, each represent a hydrogen atom or a hydrocarbon group having 1 to 20 carbon atoms which may contain a silicon atom or combine to form a ring together with the carbon atoms to which they are attached;

$Y^1$ is a carbon atom, a silicon atom or a germanium atom; and n is an integer of from 1 to 3.

2. The catalyst component for polyolefin production catalysts as claimed in claim 1, wherein in the metallocene compound represented by the general formula (1) $R^4$ is an i-propyl group, a 1-methylpropyl group, a 1-ethylpropyl group, a 1-methylbutyl group, a 1-ethylbutyl group, a 1-propylbutyl group, a cyclopentyl group, a cyclohexyl group or a phenyl group.

3. The catalyst compound for polyolefin production catalysts as claimed in claim 1, wherein in the metallocene compound represented by the general formula (1), $R^5$ is a hydrocarbon group having 1 to 20 carbon atoms which may contain a silicon atom.

4. The catalyst component for polyolefin production catalysts as claimed in claim 1, wherein in the metallocene compound represented by the general formula (1), $R^4$ is an i-propyl group, a 1-methylpropyl group, a 1-ethylpropyl group, a 1-methylbutyl group, a 1-ethylbutyl group, a 1-propylbutyl group, a cyclopentyl group, a cyclohexyl group or a phenyl group; and $R^5$ is a hydrocarbon group having 1 to 20 carbon atoms which may contain a silicon atom.

5. The catalyst component for polyolefin production catalysts as claimed in claim 1, wherein in the metallocene compound represented by the general formula (1) $R^4$ is an i-propyl group; and $R^5$ is a hydrocarbon group having 1 to 20 carbon atoms which may contain a silicon atom.

6. A polyolefin production catalyst, comprising (A) a catalyst component as claimed in any one of claims 1 to 5; (B) a Lewis acid compound; and (C) an organic aluminum compound.

7. A polyolefin production catalyst, comprising (A) a catalyst component as claimed in any one of claims 1 to 5; (B) a Lewis acid compound; (C) an organic aluminum compound; and (D) a fine particle carrier.

8. A method for producing polyolefins, comprising polymerizing an olefin with a catalyst as claimed in claim 6.

9. A method for producing an isotactic poly(α-olefin), comprising polymerizing an α-olefin represented by the general formula (4)

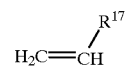
(4)

wherein $R^{17}$ is a hydrocarbon group having 1 to 6 carbon atoms, with a catalyst as claimed in claim 6.

10. A method for producing polyolefins, comprising polymerizing an olefin with a catalyst as claimed in claim 7.

11. A method for producing an isotactic poly (α-olefin), comprising polymerizing an α-olefin represented by the general formula (4)

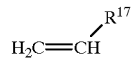
(4)

wherein $R^{17}$ is a hydrocarbon group having 1 to 6 carbon atoms, with a catalyst as claimed in claim 7.

* * * * *

UNITED STATES PATENT AND TRADEMARK OFFICE
CERTIFICATE OF CORRECTION

PATENT NO. : 6,121,182
DATED : September 19, 2000
INVENTOR(S) : Yoshikuni Okumura, Tsutomu Sakuragi, Michio Ono and Shintaro Inazawa Page 1 of 1

It is certified that error appears in the above-identified patent and that said Letters Patent is hereby corrected as shown below:

Title page,
Under "Assignee," please change "Japan Polyolafins Co., Ltd." to -- Japan Polyolefins Co., Ltd. --.

Column 9,
Lines 38-39, delete "a benzyl group, phenylmethyl group," and insert -- a benzyl group --.
Line 39, before "a triphenylmethyl group" insert -- a diphenylmethyl group, --.

Column 29,
Line 43, delete "C./3" and insert -- C/3 --.

Column 32,
Line 17, delete "C./7" and insert -- C/7 --.

Signed and Sealed this

Thirtieth Day of April, 2002

Attest:

*Attesting Officer*

JAMES E. ROGAN
*Director of the United States Patent and Trademark Office*